US006567083B1

(12) United States Patent
Baum et al.

(10) Patent No.: US 6,567,083 B1
(45) Date of Patent: May 20, 2003

(54) METHOD, SYSTEM, AND COMPUTER PROGRAM PRODUCT FOR PROVIDING ILLUMINATION IN COMPUTER GRAPHICS SHADING AND ANIMATION

(75) Inventors: Daniel R. Baum, Palo Alto, CA (US); Patrick M. Hanrahan, Portola Valley, CA (US); Matthew M. Pharr, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/937,793

(22) Filed: Sep. 25, 1997

(51) Int. Cl.$^7$ ............................................... G06T 15/50
(52) U.S. Cl. ....................................... 345/426; 345/589
(58) Field of Search .................................. 345/426, 421, 345/422, 428, 581, 582, 587, 589, 601, 602, 606, 643

(56) References Cited

U.S. PATENT DOCUMENTS

| | | | |
|---|---|---|---|
| 4,709,231 A | 11/1987 | Sakaibara et al. | 340/729 |
| 5,268,996 A | 12/1993 | Steiner et al. | 395/126 |
| 5,760,783 A | 6/1998 | Migdal et al. | 345/430 |
| 5,764,871 A * | 6/1998 | Fogel | 395/127 |
| 5,870,097 A * | 2/1999 | Snyder et al. | 345/426 |

OTHER PUBLICATIONS

"Applications of irradiance tensors to the simulation of non–Lambertian phenomena": James Arvo, Proceedings of the 22nd annual conference on Computer Graphics, 1995.*
Arvo, J., "The Irradiance Jacobian for Partially Occluded polyhedral Sources", *Computer Graphics Proceedings, Annual Conference Series*, 1994, pp. 343–350.
Ashdown, I., "Near–Field Photometry: A New Approach", *Journal of the Illuminating Engineering Society*, vol. 22, No. 1, Winter 1993, pp. 163–180.

Atherton et al., "Polygon Shadow Generation", *Computer Graphics*, vol. 12, No. 3, Aug. 1978, pp. 275–281.
Baum et al., "Improving Radiosity Solutions Through the Use of Analytically Determined Form–Factors", *Computer Graphics*, vol. 23, No. 3, Jul. 1989, pp. 325–334.

(List continued on next page.)

Primary Examiner—Mano Padmanabhan
(74) Attorney, Agent, or Firm—Woodcock Washburn LLP

(57) ABSTRACT

A method, system, and computer program product are provided that represent complex point and area illumination in computer graphics shading and animation. An irradiance vector field table representative of an irradiance field for a scene to be rendered is generated and stored in a texture memory. During rendering, the scene is lit based on irradiance vectors in the irradiance vector field table. For each point being lit, a corresponding irradiance vector is generated from the irradiance vector field table. A vector operation is performed between the irradiance vector and a surface normal for the point to compute an irradiance energy component. In one example hardware embodiment, a look-up unit looks up and interpolates irradiance vectors for selected points in the irradiance vector field table to compute an interpolated irradiance vector. A dot product unit calculates a dot product between the interpolated irradiance vector and a surface normal for the point being shaded and outputs an irradiance energy component for use in shading. The irradiance vector field table can represent an irradiance field for one or more complex point and area light sources. A set of multi-resolutional irradiance field tables covering progressively larger regions of a scene at progressively coarser resolutions is generated. One or more rendering passes are used to render a computer graphics image representing illumination from a complex point or area source. The irradiance vector field table can be generated to account for shadows and/or participating media such as fog or smoke. Shadow maps and back-projection or shadow volume algorithms can be used to determine light source visibility which is used to scale the irradiance energy component.

37 Claims, 13 Drawing Sheets

(2 of 13 Drawing Sheet(s) Filed in Color)

OTHER PUBLICATIONS

Bouknight, J. and K. Kelley, "An algorithm for producing half–tone computer graphics presentations with shadows and movable light soures", *Spring Joint Computer Conference*, 1970, pp. 1–10.

Chiu et al., "The Light Volume: an aid to rendering complex environments", *Proceedings of the Eurographics Workshop in Porto. Portugal*, Jun. 17–19, 1996, pp. 1–9.

Crow, Franklin C., "Shadow Algorithms For Computer Graphics", *Computer Graphics*, vol. 11, No. 2, Summer 1977, pp. 242–248.

Foley et al., *Computer Graphics Principles and Practice*, pp. 721–814, 855–922 and 1057–1081, Addison–Wesley Publishing, 1996.

Fosner, *OpenGL: Programming for Windows 95 and Windows NT*, pp. 181–201, Addison–Wesley Publishing, 1996.

Gershbein et al., "Textures and Radiosity: Controlling Emission and reflection with Texture Maps"m *Computer Graphics Proceedings. Annual Conference Series*, 1994, pp. 51–58.

Greger et al., "The Irradiance Volume", *IEEE Computer Graphics and Applications*, vol. 18, No. 2, Mar./Apr. 1998, pp. 32–43.

Hanrahan, et al., "A Rapid Hierarchial Radiosity Algorithm", *Computer graphics*, vol. 25, No. 4, Jul. 1991, pp. 197–206.

Hausner, Alejo, "Multipole Expansion of the Light Vector", *IEEE Transactions on Visualization and Computer Graphics*, vol. 3, No. 1, Jan.–Mar. 1997, pp. 12–22.

Woo et al., OpenGL Programming Guide, The Official Guide to Learning Open GL, Silicon Graphics, Inc. (Addison–Wesley Publ., 1993), pp. 151–211.

Reeves et al., "Rendering Antialiased Shadows with Depth Maps", *Computer Graphics*, vol. 21, No. 4, Jul. 1987, pp. 283–291.

Snyder, John M., "Area Light Sources for Real–Time Graphics", Microsoft Research Technical Report MSR–TR–96–11, Mar. 6, 1996, pp. 1–30.

Sun et al., "The Determination of Form–Factors by Lookup Table", *Computer Graphics forum*, vol. 12, No. 4, 1993, pp. 191–198.

Wallace, J.R. et al., "A Ray Tracing Algorithm For Progressive Radiosity", *Computer Graphics*, vol. 23, No. 3, Jul. 1989, pp. 315–324.

Ward, G.J. et al., "A Ray Tracing Solution for Diffuse Interreflection", *Computer Graphics*, vol. 22, No. 4, Aug. 1988, pp. 85–92.

Williams, L., "Casting Curved Shadows on Curved Surfaces", *Computer Graphics*, vol. 12, No. 3, Aug. 1978, pp. 270–274.

Stock, R., "Fourier Formulation of Illumination Optics and Computer Automated Reflector Design", Ph.D. Thesis CMU–CS–95–182, Carnegie Mellon University, 1995.

Sillion, F. and C. Puech, *Radiosity and Global Illumination*, Morgan Kaufmann Publ., 1994. (entire book and CD–ROM supplement).

Kempf et al., *OpenGL® Reference Manual*, Second Edition, Silicon Graphics, Inc. (Addison–Wesley Publishing, 1997), pp. iii–x and 1–60.

Zimmerman, K., "IES Luminaires and Spectral Radiance" and "Reference", as downloaded on Aug. 11, 1998 from internet at http://www.cs.indiana.edulhyplan/kuzimmer/IES/, Copyright 1995.

* cited by examiner

| POSITION | IRRADIANCE VECTOR |
|---|---|
| (-2.000, 0.0, -2.000) | (-0.058, 0.0, -0.066) |
| (-2.000, 0.0, -1.429) | (-0.077, 0.0, -0.065) |
| (-2.000, 0.0, -0.857) | (-0.085, 0.0, -0.046) |
| (-2.000, 0.0, -0.286) | (-0.044, 0.0, -0.008) |
| (-2.000, 0.0, 0.286) | (-0.044, 0.0, 0.008) |
| (-2.000, 0.0, 0.857) | (-0.085, 0.0, 0.046) |
| (-2.000, 0.0, 1.429) | (-0.077, 0.0, 0.065) |
| (-2.000, 0.0, 2.000) | (-0.058, 0.0, 0.066) |
| (-1.429, 0.0, -2.000) | (-0.066, 0.0, -0.108) |
| (-1.429, 0.0, -1.429) | (-0.105, 0.0, -0.133) |
| (-1.429, 0.0, -0.857) | (-0.159, 0.0, -0.140) |
| (-1.429, 0.0, -0.286) | (-0.148, 0.0, -0.054) |
| (-1.429, 0.0, 0.286) | (-0.148, 0.0, 0.054) |
| (-1.429, 0.0, 0.857) | (-0.159, 0.0, 0.140) |
| (-1.429, 0.0, 1.429) | (-0.105, 0.0, 0.133) |
| (-1.429, 0.0, 2.000) | (-0.066, 0.0, 0.108) |
| (-0.857, 0.0, -2.000) | (-0.056, 0.0, -0.159) |
| (-0.857, 0.0, -1.429) | (-0.102, 0.0, -0236) |
| (-0.857, 0.0, -0.857) | (-0.195, 0.0, -0.368) |
| (-0.857, 0.0, -0.286) | (-0.338, 0.0, -0.653) |
| (-0.857, 0.0, 0.286) | (-0.338, 0.0, 0.653) |
| (-0.857, 0.0, 0.857) | (-0.195, 0.0, 0.368) |
| (-0.857, 0.0, 1.429) | (-0.102, 0.0, 0.236) |
| (-0.857, 0.0, 2.000) | (-0.056, 0.0, 0.159) |
| (-0.286, .0., -2.000) | (-0.022, 0.0, -0.195) |
| (-0.286, 0.0, -1.429) | (-0.043, 0.0, -0.317) |
| (-0.286, 0.0, -0.857) | (-0.080, 0.0, -0.553) |
| (-0.286, 0.0, -0.286) | (-0.074, 0.0, -0.913) |
| (-0.286, 0.0, 0.286) | (-0.074, 0.0, 0.913) |
| (-0.286, 0.0, 0.857) | (-0.080, 0.0, 0.553) |
| (-0.286, 0.0, 1.429) | (-0.043, 0.0, 0.317) |
| (-0.286, 0.0, 2.000) | (-0.022, 0.0, 0.195) |
| (0.286, 0.0, -2.000) | (0.022, 0.0, -0.195) |
| (0.286, 0.0, -1.429) | (0.043, 0.0, -0.317) |
| (0.286, 0.0, -0.857) | (0.080, 0.0, -0.553) |
| (0.286, 0.0, -0.286) | (0.074, 0.0, -0.913) |
| (0.286, 0.0, 0.286) | (0.074, 0.0, 0.913) |
| (0.286, 0.0, 0.857) | (0.080, 0.0, 0.553) |
| (0.286, 0.0, 1.429) | (0.043, 0.0, 0.317) |
| (0.286, 0.0, 2.000) | (0.022, 0.0, 0.195) |
| (0.857, 0.0, -2.000) | (0.056, 0.0, -0.159) |

FIG.2B

| | |
|---|---|
| (0.857, 0.0, -1.429) | (0.102, 0.0, -0.236) |
| (0.857, 0.0, -0.857) | (0.195, 0.0, -0.368) |
| (0.857, 0.0, -0.286) | (0.338, 0.0, -0.653) |
| (0.857, 0.0, 0.286) | (0.338, 0.0, 0.653) |
| (0.857, 0.0, 0.857) | (0.195, 0.0, 0.368) |
| (0.857, 0.0, 1.1429) | (0.102, 0.0, 0.236) |
| (0.857, 0.0, 2.000) | (0.056, 0.0, 0.159) |
| (1.429, 0.0, -2.000) | (0.066, 0.0, -0.108) |
| (1.429, 0.0, -1.429) | (0.105, 0.0, -0.133) |
| (1.429, 0.0, -0.857) | (0.159, 0.0, -0.140) |
| (1.429, 0.0, -0.286) | (0.148, 0.0, -0.054) |
| (1.429, 0.0, 0.286) | (0.148, 0.0, 0.054) |
| (1.429, 0.0, 0.857) | (0.159, 0.0, 0.140) |
| (1.429, 0.0, 1.429) | (0.105, 0.0, 0.133) |
| (1.429, 0.0, 2.000) | (0.066, 0.0, 0.108) |
| (2.000, 0.0, -2.000) | (0.058, 0.0, -0.066) |
| (2.000, 0.0, -1.429) | (0.077, 0.0, -0.065) |
| (2.000, 0.0, -00857) | (0.085, 0.0, -0.046) |
| (2.000, 0.0, -0.286) | (0.044, 0.0, -0.008) |
| (2.000, 0.0, -0.286) | (0.044, 0.0, 0.008) |
| (2.000, 0.0, 0.857) | (0.085, 0.0, 0.046) |
| (2.000, 0.0, 1.429) | (0.077, 0.0, 0.065) |
| (2.000, 0.0, 2.000) | (0.058, 0.0, 0.066) |

FIG.2B-1

METHOD, SYSTEM, AND COMPUTER PROGRAM PRODUCT FOR PROVIDING ILLUMINATION IN COMPUTER GRAPHICS SHADING AND ANIMATION

BACKGROUND OF THE INVENTION

1. Field of the Invention

The present invention relates to computer graphics, and in particular, to shading computer-generated images.

2. Related Art

Shading is an important component that contributes to the realism of a geometric scene to be rendered. The calculations associated with shading can be split into two parts: finding surface reflectance properties at each point being shaded, and computing the incident illumination at the point being shaded. Surface reflectance properties are used by computer graphics application programming interfaces (graphics APIs) to define how a surface dissipates light. For example, one graphics API, OpenGL™ by Silicon Graphics, Inc., supports five surface reflectance properties: diffuse and ambient properties, specular and shininess properties, and an emissive property. See, e.g. R. Fosner, *OpenGL™ Programming for Windows 95 and Windows NT* (Addison-Wesley Pub.: Reading, Mass. 1997), Chapter 9, "Colors, Materials, and Lights," pp. 181–201.

The shading calculation for an incident light component, however, is fairly primitive in current graphics hardware. As such the overall shading realism is diminished regardless of the sophistication in which surface reflectance properties are represented. In current commercial graphics shaders, incident light sources are only represented by point source lighting models. For example, OpenGL™ only supports directional lights, point light sources with varying distance-based falloff functions, and spot lights, which provide illumination in a cone.

One important type of point light source not yet represented in commercial graphics shaders is a point light source with emission varying by direction, as described by the IES standard luminaire file format. The IES standard luminaire file format is a standard representation of emission from complex emitters, assuming an observer is sufficiently far away that the source can be treated as a point emitter. An IES recommended standard file format for electronic transfer for photometric data, IES LM-63-1990, is available from the Illuminating Engineering Society of North America.

In contrast to point lights, real-world light sources are area sources. Current methods for computing incident light from an area light source are impractical for computer graphics applications and systems. Current techniques are either too inefficient and expensive for hardware or real-time applications, or are only effective for area luminaires with limited shapes or emission distributions. For example, Ashdown has developed a method for mapping the emission distributions from complex area light sources onto a sphere (Ashdown, I., *J. Illuminating Eng. Soc.* 22(1):163–180 (Winter 1993)). Outgoing emission at a number of points on the sphere is computed for each point shaded—the computational requirements of this technique are excessive for current graphics hardware. Stock has developed a similar method, where the directional distribution of a light source is computed at various points over a sphere (Stock, R. D., *Fourier Formulation of Illumination Optics and Computer-Automated Reflector Design*, Ph.D. thesis, CMU (1995)). This distribution is projected into a Fourier space, and the coefficients are interpolated over the source of the sphere to construct intermediate distributions at arbitrary points. However, the techniques of Ashdown and Stock are still impractical for hardware or real-time applications.

Snyder has investigated closed form expressions for incident illumination for various types of area light sources (Snyder, J., "Area light sources for real-time graphics," *Microsoft Res. Tech. Rep.* MSR-TR-96-11 (March 1996)); this work is based on a paper written by Arvo in SIGGRAPH '95 (Arvo, J., "Applications of irradiance tensors to the simulation of non-Lambertian phenomena," in *ACM SIGGRAPH '95 Conf Proc.*, Cook, R., ed., Addison Wesley (August 1995), pp. 335–342). However, Snyder's techniques are still not sufficiently efficient for hardware implementation, and are limited to a small set of types of emitters.

Sun et al. have investigated techniques for tabularizing the calculation of the differential area to area form-factor (Sun, J., et al., *Computer Graphics Forum* 12(4):191–198 (1993)). This computation is equivalent to finding the incident energy from a diffusely emitting light source to a point. This technique reduces computation by tabularizing some aspects of it, but still has significant computational demands and does not easily generalize to more general emitter shapes or non-diffuse emission distributions.

Algorithms based on radiosity have been used to generate images of environments, taking into account both light from area light sources as well as interreflections of light from non-emissive surfaces. For a general introduction to radiosity, see: Francois Sillion and Claude Puech, *Radiosity and Global Illumination,* Morgan Kaufmann Publ: USA, 1994. Radiosity algorithms typically compute a simulation of light transport in a time-consuming pre-processing step, and the result can then be displayed interactively. With radiosity techniques, the lighting solution is computed at a fixed set of points in the environment independent of the viewing parameters used for display. This one set of solution points can never be sufficient to provide an accurate solution for all possible viewing parameters.

Although complete radiosity solutions are impractical for interactive viewing of scenes with area light sources, some of the techniques used in radiosity solutions offer possibilities for computing light from area sources. These techniques are too computationally expensive and too inflexible for general applicability.

One of the techniques commonly used in radiosity algorithms to compute incident light at a point (the form-factor computation) is based on computing a contour integral around the edges of a polygonal light source (Daniel R. Baum and Holly E. Rushmeier and James M. Winget, "Improving Radiosity Solutions Through the Use of Analytically Determined Form-Factors", SIGGRAPH '89 Proceedings, p. 325–334.). Although this is a potentially exact computation of the incident light, it is currently too expensive to evaluate in an interactive system, and cannot easily be extended to account for lights with non-diffuse emission distributions.

Wallace et al. have proposed a more efficient but less accurate method to compute form-factors, based on a simplifying assumption that the light is disc shaped (John R. Wallace and Kells A. Elmquist and Eric A. Haines, "A Ray Tracing Algorithm for Progressive Radiosity", SIGGRAPH '89 Proceedings). This is not an exact computation, unless the light is disc shaped and the point where incident light is being computed is parallel to the emitter and directly above or below it. Furthermore, the computation is still not efficient enough for real-time applications and cannot be easily extended to account for lights with varying emission distributions.

Ward has developed algorithms for global illumination and area light source computation based on computing scalar irradiance values at points on surfaces and interpolating them to compute irradiance at nearby points. See, Ward, Gregory J., et al., "A Ray Tracing Solution for Diffuse Interreflection", in *Computer Graphics* (*SIGGRAPH '88 Proc.*); Ward, Gregory J. and Heckbert, P., "Irradiance Gradients" in Third Eurographics Workshop on Rendering, May 1992; Ward, Gregory J., "The RADIANCE Lighting Simulation and Rendering System" in *SIGGRAPH '94 Proc.*, Orlando, Fla., Jul. 24–29, 1994. Although these algorithms produce high-quality lighting simulations and naturally adapt to the rate at which irradiance is changing in a scene, they depend on storing irradiance estimates in a spatial data structure that is too complex for interactive applications, and the irradiance estimates are combined and weighted by a function that is also too complex for interactive applications. This algorithm doesn't store irradiance in a vector form, and doesn't tabularize irradiance into a regular table structure which is necessary for efficient look up operations in hardware.

Other volumetric illumination representations have been developed by Chiu, K., et al., "The Light Volume: An Aid To Rendering Complex Environments", Eurographics Workshop on Rendering, 1996 and Greger, G., et al., "The Irradiance Volume", to appear in IEEE Computer Graphics and Applications, 1997.) These approaches also store representations of scene irradiance in a spatial data structure and interpolate them for intermediate points in the scene. These algorithms also require costly look-ups and significant computation to determine irradiance at points being shaded, making them unsuitable for interactive applications. This algorithm doesn't store irradiance in a vector form, and doesn't tabularized irradiance into a regular table structure which is necessary for efficient look up operations in hardware.

An efficient technique for computing incident-light from complex point or area luminaires is needed. More complex luminaires are important for simulating more realistic scenes. A surface illuminated by a large area light source has a significantly softer appearance than if it were illuminated by a point source. Area light sources can also model common light sources (e.g., fluorescent tubes) more accurately than point sources.

Thus, a computer graphics method and system for shading and animation is needed which can efficiently compute incident light from point and/or area light sources at interactive rates. An efficient and general computing technique is needed which can compute incident light from a wide variety and range of point and area light sources in a rendered scene including sources with potentially complex emission distribution functions. Light sources also need to be represented when given data in the form of point light sources with emission varying by direction, as described by the IES standard luminaire file format.

SUMMARY OF THE INVENTION

According to one embodiment of the present invention, a method, system, and computer program product are provided that represent complex point and area illumination in computer graphics shading. An irradiance vector field table representative of an irradiance field for a scene to be rendered is generated and stored. During rendering, the scene is then lit based on irradiance vectors in the irradiance vector field table.

For each point being lit, a corresponding irradiance vector is looked-up in the irradiance vector field table. A vector operation is performed between the irradiance vector and a surface normal for the point to compute an irradiance energy component. The irradiance energy component is then used in determining a final shade value for the point.

In one example hardware embodiment, a look-up unit looks up and interpolates irradiance vectors for selected points in the irradiance vector field table to compute an interpolated irradiance vector. A dot product unit calculates a dot product between the interpolated irradiance vector and a surface normal for the point being shaded and outputs an irradiance energy component. The irradiance energy component is used to determine the surface color of the point. For example, the irradiance energy component can be used in conjunction with the surface material properties to compute the surface color of the point.

According to a further feature of the present invention, a three-dimensional irradiance vector field table representative of a three-dimensional irradiance field can be generated and stored in any type of memory including, but not limited to, texture memory. The irradiance vector field table can represent an irradiance field for one or more point light sources including, but not limited to, a point light source defined by a luminaire file format. The irradiance vector field table can also represent an irradiance field for area light sources including, but not limited to, direct area emitters, such as, light bulbs, fixtures, and other area luminaires, and indirect area emitters, such as, secondary reflections from objects in a scene or a combination of both direct and indirect area emitters.

Because light is represented in a vector field, standard vector field algebraic operations can be performed on the field. For example, the fields for two light sources can be added together to find a single field that represents their combined illumination. This can make it possible to incorporate lighting from a number of light sources without increasing the computation that must be performed when shading calculations are performed.

According to a feature of the present invention, the irradiance vector field table is generated to account for shadows, or participating media, such as fog or smoke. In one embodiment, visibility information is encoded in the irradiance vector field table to represent shadows and/or participating media in the scene.

In another embodiment of the present invention, irradiance vector field tables are computed without regard to shadows. Shadow maps are computed for a number of points on an emitter surface. The computed shadow maps are then used as in conventional shading calculations involving shadow maps as an approximation of how much of the light source is visible to the point being shaded. In particular, after a dot product operation is performed to obtain an irradiance energy component, the irradiance energy component is scaled using shadow map(s). Alternatively, standard back projection or shadow volume algorithms can be used to compute light source visibility from a point being shaded. The computed visibility is then used to scale the irradiance energy component.

According to a further feature of the present invention, a set of irradiance vector field tables is generated. Each table encompasses a larger volume of space. This reduces storage requirements and the number of computations needed to generate the table by taking advantage of situations where the irradiance field changes more slowly the farther away one is from the light source.

In one example implementation, a set of irradiance vector field tables is generated and stored as a clip-map (e.g., three-dimensional clip-map) to provide adaptive level-of-detail and to save texture memory. In the clip-map, the set of multi-resolutional irradiance field tables represent equal-size memory regions (also called tiles) which cover progressively larger regions of a scene at progressively coarser resolutions.

According to another embodiment of the present invention, multiple rendering passes are used to render a computer graphics image representing illumination from a complex point or area source. An irradiance vector field table is generated and stored in a texture memory. A first image is rendered using the irradiance vector field table to color pixels and stored in a first frame buffer. A second image is rendered and stored in a second frame buffer. The second image has surface normals encoded in red, green, and blue (RGB) color components.

To calculate a dot product, the first and second images are multiplied to obtain a third image. Components in the third image are accumulated to obtain a fourth image. The scene is rendered with any color and/or texture (not including the illumination represented by the irradiance field table) to obtain a fifth image. The fourth and fifth images are multiplied to obtain a final display image. This decoupling of the incident lighting component and the surface shading component is similar to the decoupling of incident lighting and texturing used to include texture mapping in a radiosity system (Gershbein, R., et al., "Textures and Radiosity: Controlling Emission and Reflection with Texture Maps" in *SIGGRAPH '94 Proc.*).

Thus, the present invention provides an efficient and general technique for computing incident light from point or area luminaires at interactive rates. Complex point and area luminaires can be simulated efficiently to provide high-quality shading, animation, and more realistic scenes. Common area light sources, such as, incandescent bulbs, fluorescent tubes, and lighting fixtures, and secondary reflections, can be represented in computer graphics shading and animation. In one embodiment, an efficient hardware implementation is realized which computes incident illumination light for one or more area light sources yet requires minimal additional hardware in a rendering pipeline.

BRIEF DESCRIPTION OF THE FIGURES

The file of this patent application contains at least one drawing executed in color. Copies of this patent with color drawing(s) will be provided by the Patent and Trademark Office upon request and payment of the necessary fee.

The accompanying drawings, which are incorporated herein and form part of the specification, illustrate the present invention and, together with the description, further serve to explain the principles of the invention and to enable a person skilled in the pertinent art to make and use the invention.

FIG. 2B is an irradiance field table representing the example irradiance vector field of FIG. 2A according to the present invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview and Terminology

Figure 1:
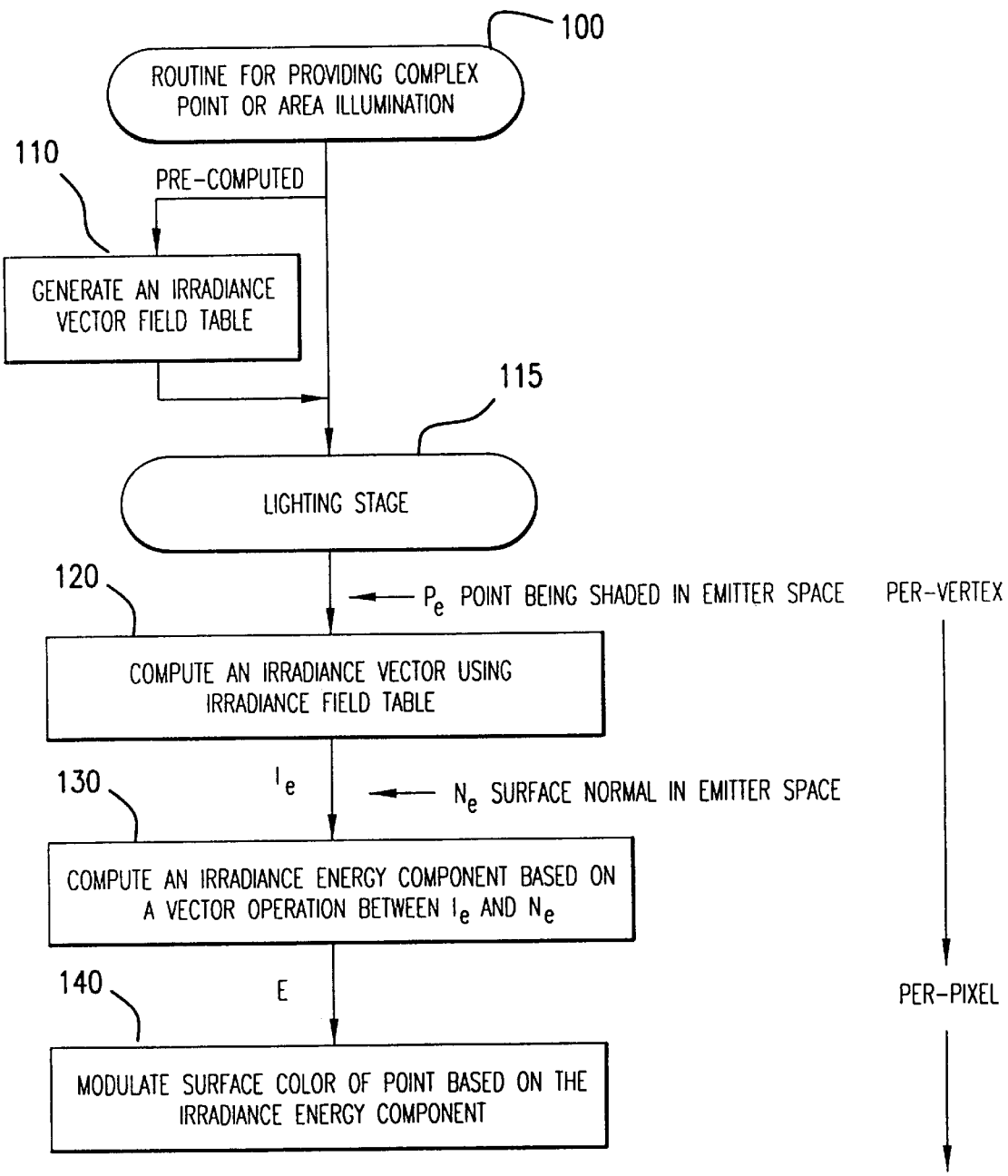
FIG. 1 is a flowchart of a routine for providing illumination in computer graphics shading according to one embodiment of the present invention.

The present invention uses a tabularized vector irradiance field to compute incident illumination light representative of a point or area light source in computer graphics shading and animation. The vector irradiance field is used in the present invention to encode the emission distributions from complex luminaires and compute incident light at points where shading calculations are performed. The vector irradiance field is known to illumination engineers in the electrical lighting field. See, Moon, P. and Spencer, D. E., *The Photic Field*, MIT Press, Cambridge, Mass. (1981)). The vector irradiance field is not as well known in computer graphics, though Arvo has based some closed-form illumination expressions on a vector irradiance field (Arvo, J., "The irradiance Jacobian for partially occluded polyhedral sources," in *Proc. ACM SIGGRAPH '94*, Glassner, A., ed., ACM Press (July 1994), pp. 343–350) and Hausner has investigated finding a spherical harmonic expansion of the field (Hausner, A., "Multipole Expansion of the Light Vector," *IEEE Transactions on Visualization and Comp. Graphics* 3(1) (January–March 1997), pp. 12–22).

Prior to the present invention, however, there has been no teaching or suggestion to combine irradiance vector field art with commercial computer graphics shading art to efficiently represent light sources. Despite the commercial demand for an efficient graphics shader that supports complex point or area light sources, there has been no teaching or suggestion to efficiently and generally represent a point or area light source in a commercial graphics shader using a tabularized irradiance vector field, as in the present invention.

The irradiance field represents the emission from an emitter as a vector field in three-dimensional space. As recognized by the inventors, the irradiance vector field has two related characteristics that lead to highly efficient computation in computer graphics shading:

The computation to find incident irradiance (emitted energy from the luminaire) at a point in space is a dot product: the dot product of the surface normal at the point with the irradiance vector at the point.

This computation is independent of the complexity of the luminaire: given a representation of the irradiance field, the actual geometry and emission distribution of the emitter are no longer needed for the lighting calculation.

According to an embodiment of the present invention, a tabularized form of the irradiance field is generated and stored in a three-dimensional table in an efficient, inexpensive hardware implementation. According to another embodiment of the present invention, a set of multi-resolutional irradiance vector field tables is used which provide more precision close to the emitter (where the field changes rapidly), and less precision far away (where the field changes very slowly). The set of multi-resolutional irradiance vector field tables provides an adaptive level-of-detail and saves memory costs. In one example, the set of multi-resolutional irradiance vector field tables is a clipmap. Note an adaptive representation of illumination energy has previously been used to accelerate radiosity algorithms by Hanrahan, P., et al., "A Rapid Hierarchical Radiosity Algorithm", Computer Graphics (*SIGGRAPH '91 Proc.*).

Calculations can be performed in fixed-point or floating point arithmetic. In one implementation, calculations are performed using fixed-point arithmetic. This fixed-point implementation currently runs at 15 fps (frames per second) on an Infinite Reality graphics machine sold by Silicon Graphics, Inc., a rate fast enough to support real-time computer graphics rendering and smooth animation.

Terminology

The term "area light source" is used to refer to any light source having an area of light emission in a computer graphics scene. An area light source can include a direct area emitters, such as, light bulbs, fixtures, and other area luminaires, and indirect area emitters, such as, secondary reflections from objects in a scene.

The terms "shading model", "lighting model", "illumination model", "global illumination model", and equivalents thereof, are used herein interchangeably to refer to any model or lighting equation that describes factors for determining a surface's color. The present invention can be applied with any illumination model including, but not limited to, the illumination models described herein as examples and those described in Foley et al., *Computer Graphics: Principles and Practice, Second Ed. in C* (Addison-Wesley Publ.: Reading, Mass.), 1996 (incorporated in its entirety herein by reference), in particular see, chapter 16, pp. 721–814; and Beider et al., *OpenGL Programming Guide*, Silicon Graphics, Inc. (Addison-Wesley Publishing Co., 1993), chapter 6, pp. 157–194 (incorporated herein by reference).

Example Environment

The present invention is described in terms of an example computer graphics processing environment. As described herein, the present invention can be implemented as software, firmware, hardware, or any combination thereof. In one preferred implementation, the present invention provides an efficient hardware simulation of complex point and area light sources.

Given the description herein, it would be obvious to one skilled in the art to implement the present invention in any computer graphics application, application programming interface (API), or system including, but not limited to, a computer graphics processor (single chip or multiple chips), high-end to low-end graphics workstations, gaming platforms, systems and consoles, network architectures (e.g., client/server, local, intermediate or wide area networks), and virtual machine (e.g., a Java-created application). Any computer graphics architecture can be used including, but not limited to, an Open GL™ graphics API architecture (including but not limited to Infinite Reality, Indigo$^2$, Indy, Onyx, or O$_2$ graphics workstations manufactured by Silicon Graphics, Inc.) and raster graphics architectures such as those described in Foley et al., chapter 18, pp. 855–922 (incorporated herein by reference above). Of course, these specific computer graphics systems are recited as examples which can support the present invention, but do not necessarily have to have the present invention to operate. For example, an Open GL™ graphics API architecture does not require use of the present invention. In other words, an Open GL™ graphics API architecture can provide illumination without representing light source(s) with an irradiance vector field, as described herein with respect to the present invention.

Description in these terms is provided for convenience only. It is not intended that the invention be limited to application in this example environment. In fact, after reading the following description, it will become apparent to a person skilled in the relevant art how to implement the invention in alternative environments.

The Irradiance Field-Theory

The irradiance vector at a point P having components ($P_x$, $P_y$, $P_z$) generated by a light source is:

$$\vec{\Phi}(P) = \frac{1}{4\pi} \int_A \frac{1}{r^2} L_e(x_A, \omega)\vec{V}\cos\theta Vis(P, x\_A)Vol(P, x\_A)dA$$

where the integral is over the area A of the emitter, $L_e$ is the emitted radiance at a point $x_A$ on the emitter in the direction $\omega$, $r^2$ is the square of the distance r from P to $x_A$, and V is the normalized vector from $x_A$ to P. $\omega$ and $\theta$, the angle between V and the emitter's surface normal at $x_A$ are determined by V. Vis(P, x\_A) is a visibility term, with a value of 1 if the points P and x\_A are visible to each other and a value of 0 if there is an occluder between them. Vol(P, x\_A) represents volume scattering effects of attenuating media between P and x\_A; it can include both attenuation of light that is emitting from x\_A before it reaches P as well as in-scattering of light from other points on the emitter before it reaches P.

The incident irradiance at the point P is computed by calculating the dot product of the surface normal at P and the irradiance field vector at P. As long as the emitter is not partially hidden by the horizon at P, this computation is exact. If the light source is partially hidden below the horizon at the point being shaded, the computation will report that more light is arriving than is actually arriving; however, this is not a major shortcoming because the amount of energy arriving when the light is close to the horizon is typically low.

The irradiance field for a point light source at origin (0,0,0) with uniform radiant intensity in all directions in a vacuum with no occluding objects present trivially found:

$$\vec{\Phi}(P) = \frac{(P_x, P_y, P_z)}{r^3}$$

where $$r = \sqrt{P_x^2 + P_y^2 + P_z^2}$$

Computing the Irradiance Field

The field for an IES point source luminaire can be easily computed by taking the field for a point source and scaling the vectors based on the emission in the direction of a point in the field from the source. Computing the irradiance field for more complex emitting geometry and more complex emission distributions is more complicated than for point sources.

Finding the field for area light sources requires computing the integral above: closed form solutions exist for polygonal sources (Arvo, J., "The irradiance Jacobian for partially occluded polyhedral sources," in *Proc. ACM SIGGRAPH '94*, Glassner, A., ed., ACM Press (July 1994), pp. 343–350, incorporated herein in its entirety by reference), and disc sources (Moon, P. and Spencer, D. E., *The Photic Field*, MIT Press, Cambridge, Mass. (1981), incorporated herein in its entirety by reference) that have uniform emission distributions. The irradiance field for more complex combinations of geometry and emission distribution functions will not always have a closed form solution. In this case, however, numeric integration methods should converge quickly; the irradiance field is typically smooth and slowly changing.

Shading Based on an Irradiance Vector Field

FIG. 1 shows a shading routine 100 for providing complex point or area illumination according to one embodiment of the present invention. First, an irradiance vector field table is generated (step 110). The irradiance vector field table has entries representing the vectors in an irradiance field. The irradiance vector field table is a three-dimensional table. Preferably, the irradiance vector field table is pre-computed and stored in a memory (such as a texture memory) prior to rendering. The present invention, however is not so limited, as the irradiance vector field table can be calculated and stored in a memory (such as a texture memory) during rendering depending upon processing power, time, and other design criteria. One-dimensional and/or two-dimensional tables can also be used.

Lighting stage 115 includes steps 120–140. Lighting stage 115 lights (or shades) one or more points in an object being rendered using irradiance field data stored in step 110. In general, for a point in emitter space $P_e$, to compute lighting and color, the irradiance vector at the point is computed by looking it up in the irradiance field table (step 120). For example, the eight vectors in the table that surround the point of interest $P_e$ are found and trilinearly interpolated to find an irradiance vector $I_e$ at the point $P_e$.

Next, an irradiance energy component E is computed based on a vector operation between irradiance vector $I_e$ and a surface normal $N_e$ at point $P_e$ (step 130). In one preferred example, the vector operation consists, of calculating a dot product between irradiance vector $I_e$ and a surface normal $N_e$ at point $P_e$ to find incoming irradiance energy component E. The irradiance energy component E is then used in any lighting equation or shading model to modulate surface color (step 140).

In one implementation where polygons (e.g. triangles) are rasterized, steps 120 and 130 are calculated on per-vertex basis (and interpolated inside the triangle), while step 140 is carried out on a per-pixel basis. However, the present invention is not intended to be so limited. In general, steps 120 to 140 can each be computed on a per-vertex and/or per-pixel basis, as would be apparent to a person skilled in the art given this description.

For image rendering algorithms (such as ray tracing or the REYES algorithm) that are not based on rasterizing polygons, shading calculations can be performed at varying rates and at varying locations. Application of the present invention to other rendering algorithms would be apparent to a person skilled in the art given this description.

Figure 2A:
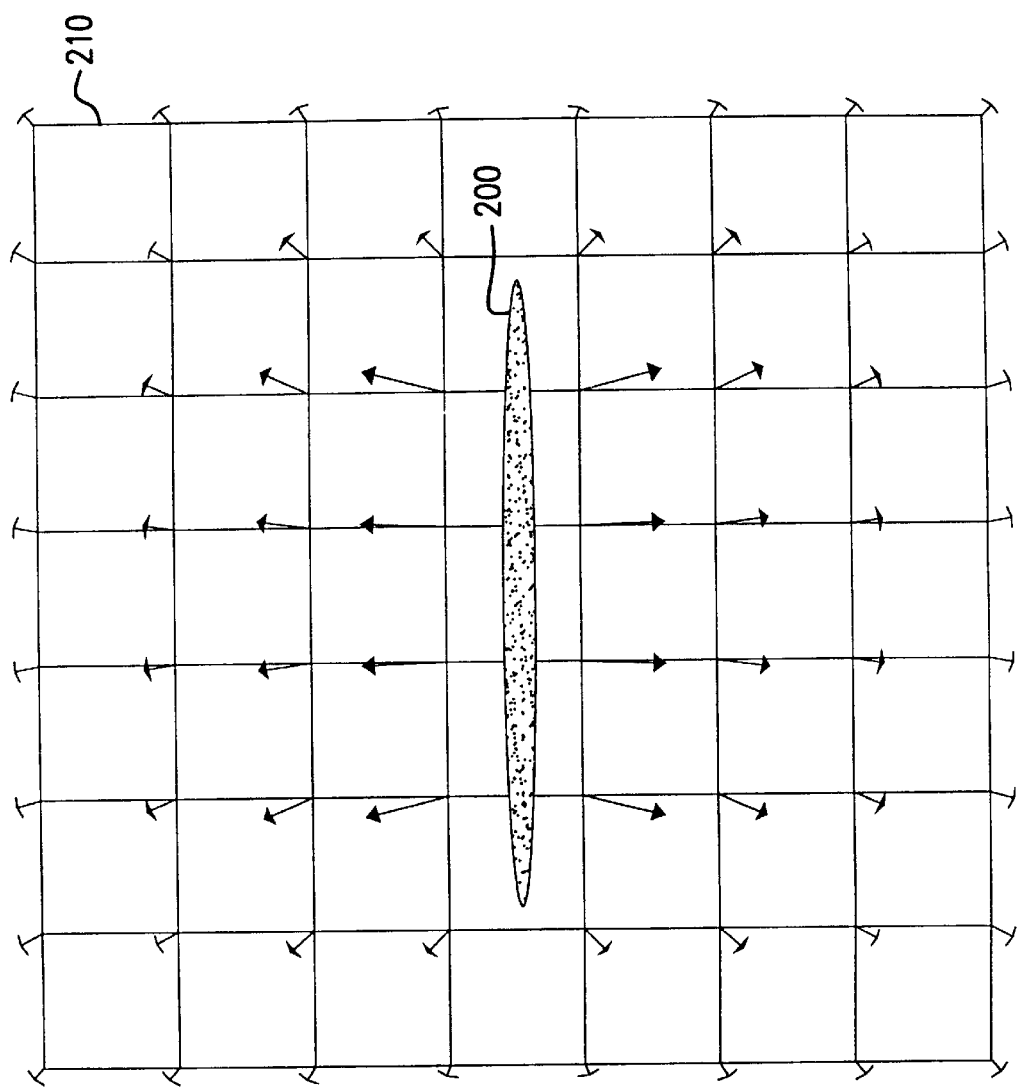
FIG. 2A is schematic diagram of an example irradiance vector field according to the present invention.

FIG. 2A is schematic diagram of a two-dimensional slice of an example irradiance vector field 210 for a disc source 200, according to the present invention. FIG. 2B is an irradiance field table 220 representing the example irradiance vector field 210 of FIG. 2A. For clarity, irradiance vector field 210 only includes 64 points. At each point, is a vector representing an irradiance field vector. Accordingly, irradiance field table 220 is a two-column table having sixty-four entries (or rows). Each entry includes position and irradiance field vector coordinates of a respective point and vector. The position is given by three spatial coordinates in a coordinate space, such as, the coordinate space of the complex point or area light source (also called emitter coordinate space). The vector coordinates represent three components defining the irradiance field at the point.

In the above description of FIG. 1, the irradiance vector field table was generated in an emitter space. In other words, when the table of irradiance vectors for a light source is computed, the emitter is at the origin with some orientation. The point $P_e$ being shaded and surface normal $N_e$ were also in emitter space (or are transformed to emitter space from world space or any other coordinate space prior to lighting).

To position the emitter differently when rendering, it can be transformed with a standard 4×4 geometry matrix. Two adjustments are then made in shading routine 100 to ensure calculations are performed in a common coordinate space. First, each point being shaded is transformed by the same coordinate transformation as the emitter, before the point coordinates are used to index the irradiance vector field texture. Second, the same transformation is applied to the surface normal at the point being shaded before the dot product is computed.

Pseudocode

To summarize the algorithm of the present invention, this section has two short pseudocode representations of its execution. In one embodiment described below with respect to FIG. 3, either code can be implemented using frame-buffer operations, so that it is effectively running in parallel at all points being shaded.

EXAMPLE 1

```
float dot (Vector V Normal N)
{
return (V.x*N.x)+(V.y*N.y)+(V.z*N.z);
}
/* transformation that is applied to the emitter */
Transformation world2emitter;
/* multi-resolution representation of the
irradiance field */
VectorField irradiance-field;

Color shade_pixel (Point P, Normal N, Color C)
{
   Vector irradiance_vector;
   float modulate;

/* transform the point being shaded to the coordinate
      space of the emitter*/
   P=world2emitter.transform(P);
   N=world2emitter.transform(N);

/* use this point to look up the irradiance vector*/
   irradiance_vector=irradiance_field.lookup(P);

/* compute the dot product to find the incoming irradiance
      */
```

```
modulate=dot (irradiance_vector, N);

/* use the result to modulate the surface's color */ return
    C * modulate;
}
```

EXAMPLE 2

```
/* transformation that is applied to the emitter and its inverse
    */
Transformation world2emitter;
Transformation emitter2world;

/* multi-resolution representation of the irradiance field */
VectorField irradiance-field;

Color shade_pixel (Point P, Normal N, Color C)
{
    Vector irradiance_vector;
    double modulate;

/* transform the point being shaded to the coordinate
        space of the emitter*/
    P=world2emitter.transform(P);

/* use this point to look up the irradiance vector*/
    irradiance_vector=irradiance_field.lookup(P);

/* transform the irradiance vector found back into world
        space (which is the space that the surface normal is in.
        */
    irradiance_vector=emitter2.world.transform
        (irradiance_vector);
    /* compute the dot product to find the incoming irradiance
        */
    modulate=dot (irradiance_vector, N);

/* use the result to modulate the surface's color */ return
        C * modulate;
}
```

Shadow and Media Effects

Computing shadows and/or participating media effects from light sources is also important for realism. In one example, visibility information representing shadows and/or participating media, such as, fog or smoke, is further encoded in the tabularized field. For example, in regions of space that were in shadow, the vectors would be zero. Under this approach, shading quality for shadows would be less coarse in higher resolution irradiance vector field tables.

The effects of participating media (such as fog or smoke) on light as it travels through space can be incorporated into the vector table as well. The irradiance vector field table is generated as described above without regard to participating media. Each vector is then scaled by a term that represents how much light is to be attenuated and how much light has been scattered at each point in the table. For example, if the scene and the light source are surrounded by homogeneous fog that absorbs 10% of the light along each unit distance and if only attenuation due to the fog is considered, the volume term in the irradiance field equation would be Vol(P, x_A)=0.9 ^(distance(P, x_A)). Mobley has developed closed form expressions for volumetric scattering that include multiple scattering of light as well as attenuation that could also be used for the volume term. See, Mobley, "Light and Water: Radiative Transfer in Natural Waters" Academic Press, 1994, incorporated herein in its entirety by reference.

This makes it possible to efficiently simulate the effects of complex scattering of light by media when the table is generated. There is no additional cost to including media effects when a point is being shaded.

In another embodiment, shadow maps can be used with the present invention. Shadow maps are effective for computing shadows from point sources. In particular, shadow maps can be computed for a number of points on the source. Irradiance vector field table(s) can be computed with or without regard to shadows or participating media effects. After the irradiance energy component is found in a dot product operation, the irradiance energy component is scaled with an estimate of what fraction of the emitter is visible based on information from the shadow maps. See, Williams, L., "Casting curved shadows on curved surfaces," in *Computer Graphics* (*SIGGRAPH '78 Proc.*), vol. 12 (August 1978), pp. 270–274; and Reeves, W. T., et al., "Rendering antialiased shadows with depth maps," in *Computer Graphics* (*SIGGRAPH '87 Proc.*, vol. 21, Stone, M. C., ed., (July 1987), pp. 283–291, both of which are incorporated by reference herein. Note that shadow maps (and particularly multiple shadow maps used for area light sources) are only an approximation to the visibility between the emitter and the receiving point.

Alternatively, back-projection algorithms or shadow volume algorithms can be used instead of shadow maps to compute light source visibility and then to scale the irradiance energy component. However, back projection algorithms are typically more inefficient than computing light source visibility with shadow maps. See, e.g., the back-projection algorithms described by Bouknight, W. J, and Kelley, K. C, "An Algorithm for Producing Half-Tone Computer Graphics Presentations with Shadows and Movable Light Sources," Proceedings of the Spring Joint Computer Conference, AFIPS Press, Montvale, N.J., 1970, pp. 1–10 (incorporated in its entirety herein by reference); and Atherton, P. R., Weiler, K., and Greenberg, D, "Polygon Shadow Generation," Proceedings of SIGGRAPH 78, pp. 275–281 (incorporated in its entirety herein by reference); and the shadow volume algorithm described by Crow, F. C, "Shadow Algorithms for Computer Graphics," Proceedings of SIGGRAPH 1977, pp. 242–247 (incorporated in its entirety herein by reference). Note that shadow maps (and particularly multiple shadow maps used for area light sources) are only an approximation to the visibility between the emitter and the receiving point.

Fixed Point and Floating Point Implementations

The present invention can be implemented on computer systems that use fixed-point and/or floating point arithmetic. In particular, routine 100 is performed using fixed point arithmetic when a graphics system, such as the current InfiniteReality system by Silicon Graphics, Inc., does not support floating point values in all stages of the hardware rendering pipeline. As a result, a number of additional computations are necessary, primarily to compute the dot product, which is more complicated in fixed point arithmetic.

Figure 10A:
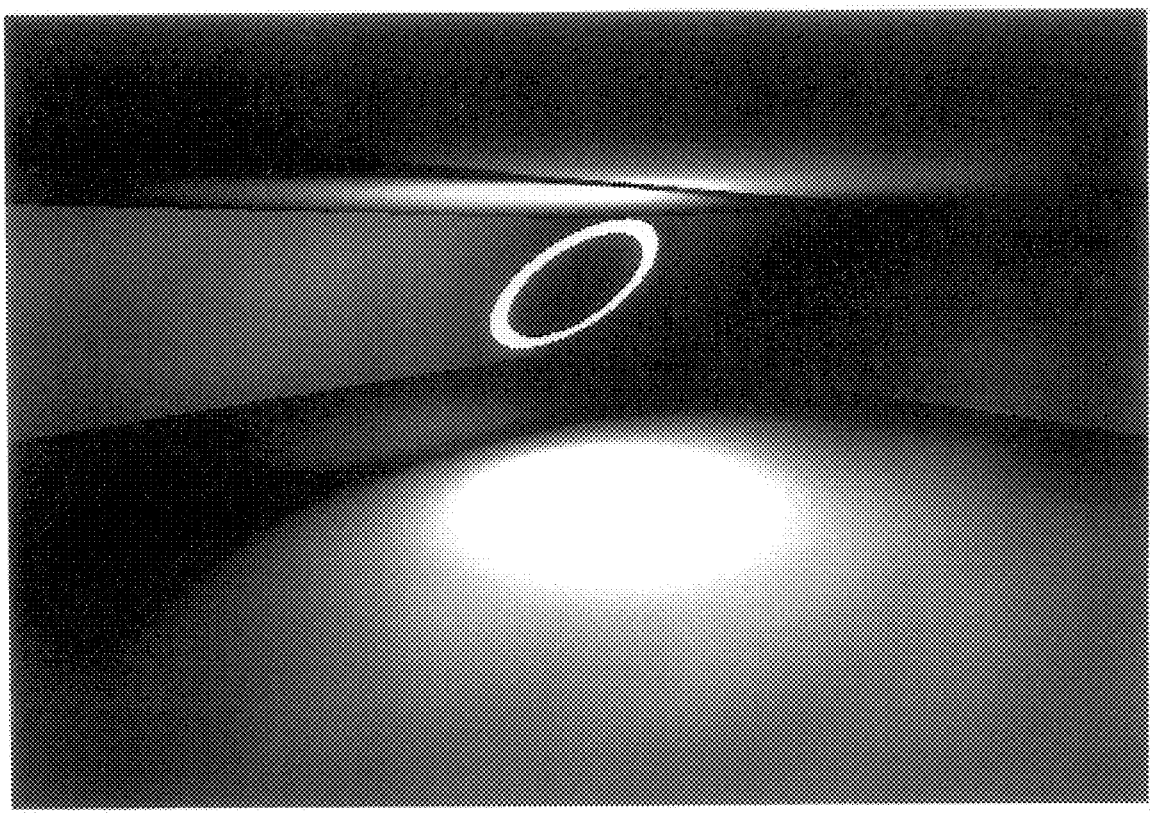
FIGS. 10A and 10B are color images showing a scene illuminated by a circular source and a disc source, drawn in a simulation of the present invention.
Figure 10B:
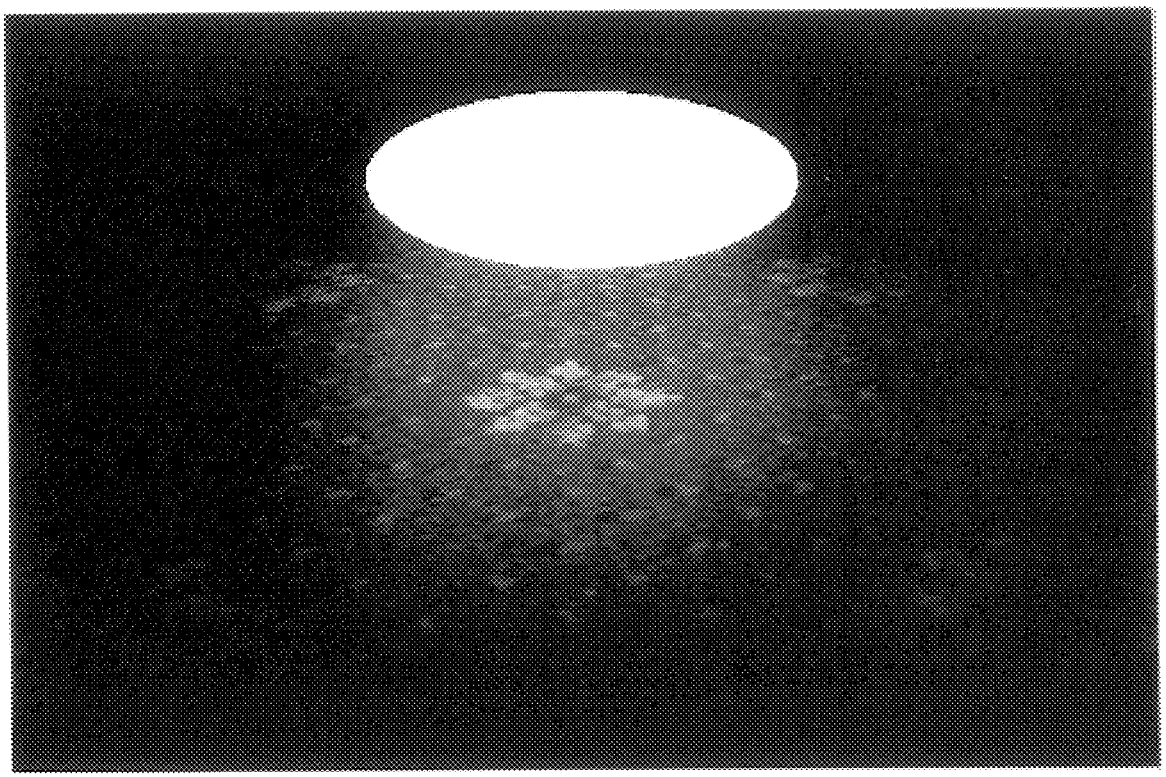

High-quality shading images of a variety of scenes with a variety of light sources using a simulator having a floating point frame buffer have been obtained. For example, FIGS. 10A and 10B are color images showing a scene illuminated by a circular source and a disc source, drawn in a simulation of the present invention.

Routine 100 can be implemented in software, firmware, hardware, and in any combination thereof, as would be apparent to person skilled in the art given this description. For example, routine 100 can be implemented in a lighting and coloring stage of a graphics engine. In one example, per-vertex operations can be implemented primarily in software and per-pixel operations can be implemented primarily in hardware.

Examples of a graphics processing environment and architecture providing complex point and area illumination according to the present invention are described in further detail with respect to FIGS. 6 to 9.

Multiple Rendering Passes

According to a further embodiment, the shading calculation described with respect to routine 100 is implemented by performing multiple rendering passes and frame buffer stores. See, e.g., the multiple rendering passes used to perform a shading calculation, as described in the commonly-owned, co-pending U.S. patent application Ser. No. 08/879,657 by Peercy et al., "Method, System and Computer Program Product for Shading," filed Jun. 20, 1997 (incorporated by reference herein).

Figure 3:
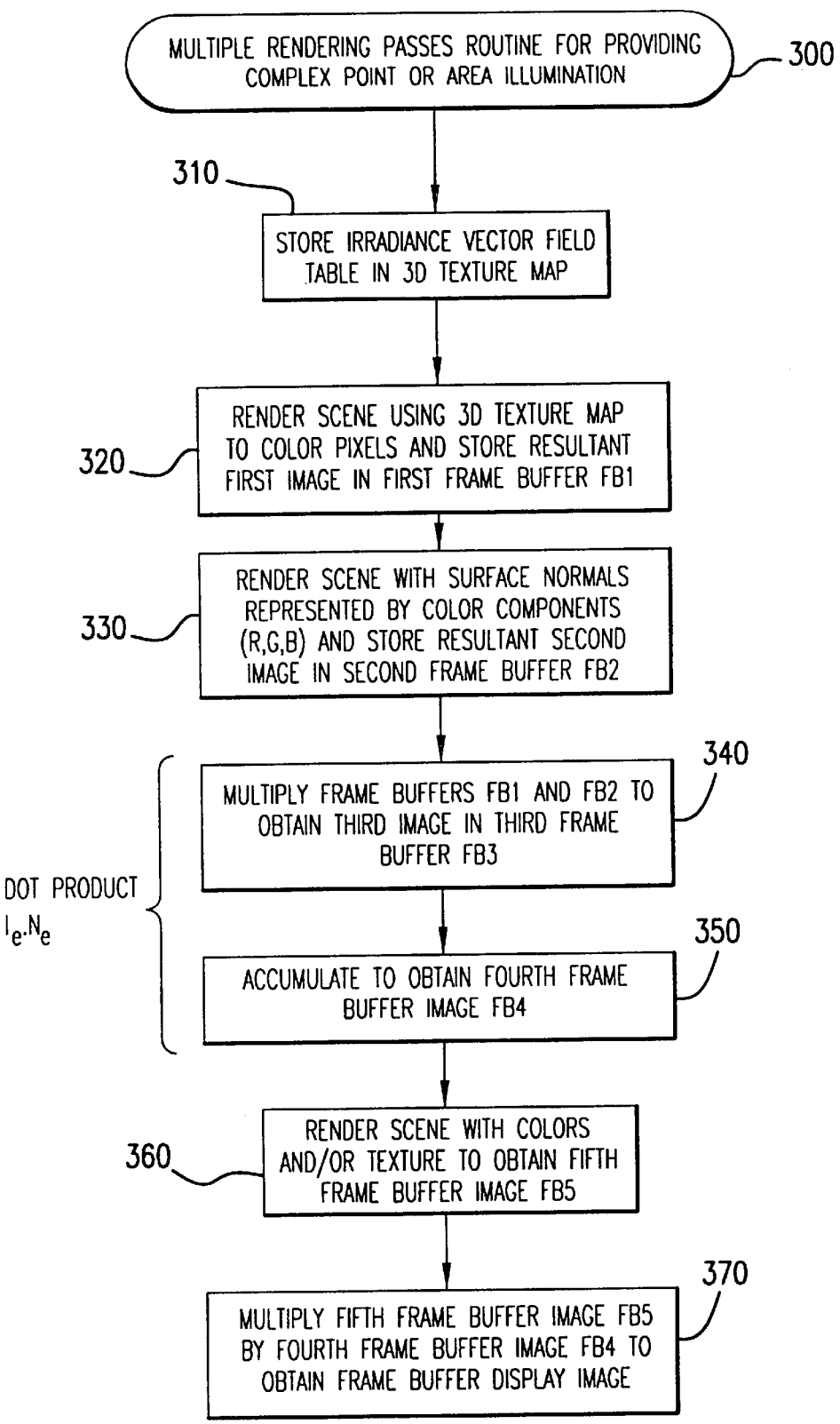
FIG. 3 is a flowchart of a multiple rendering passes routine for providing illumination according to the present invention.

FIG. 3 is a flowchart of a multiple rendering passes routine 300 for providing complex point and area illumination according to the present invention. In routine 300, a scene with a complex point or area light source is rendered three times to do the shading calculation described in FIG. 1. In step 310, an irradiance vector field table is stored in a 2D or 3D texture map as described earlier with respect to step 110.

In step 320, a scene is rendered using the stored 3D texture map to color pixels and the resultant first image is stored in a first framebuffer (FB1). In this framebuffer, the red, green, and blue components of each pixel are equal to the respective x, y, and z components of the irradiance vector at that point. For example, in step 320, a texture generator function (such as "texgen" in OpenGL™) can be used to map points in space to the 3D texture map that holds the irradiance field—this gives an image with a trilinearly interpolated irradiance vector for each visible point that is being shaded. Next, in step 330, the scene is rendered with surface normals encoded in red, green, and blue (RGB) color components and the resultant second image is stored in a second framebuffer (FB2).

The two framebuffer images (FB1, FB2) are used to compute the dot product $I_e \cdot N_e$ (steps 340 and 350). In step 340, the contents of framebuffers, FB1 and FB2, are multiplied to obtain a third image FB3. In step 350, components of pixels in the third image are added together with the result stored in each of the red, green, and blue components to obtain a fourth framebuffer image (FB4). Finally, the scene geometry in framebuffer image FB4 is rendered with any further colors and texture-maps to obtain a fifth framebuffer image FB5 (step 360). The fourth and fifth framebuffer images FB4 and FB5 are multiplied to obtain a final framebuffer display image (step 370). In this way, the fifth image is modulated with the per-pixel results of the dot product represented in the fourth image.

As would be apparent to a person skilled in the art given this description, this six-pass algorithm can be modified to use more or fewer passes, depending on the resources available in a given hardware architecture, or depending on the speed of the operations in the passes. For example, an architecture might support a dot product operation between two framebuffers in a single pass, which would allow steps 340 and 350 to be combined into a single pass.

Multiple rendering routine 300 can be implemented as software, firmware, hardware, or any combination thereof in a computer graphics processor. In one preferred implementation, routine 300 is written as an OpenGL™ program for execution on any OpenGL™ machine including, but not limited to, graphics workstations manufactured by Silicon Graphics, Inc.

Clip Maps

According to another embodiment of the present invention, clip-maps are used to store a 2D or 3-D irradiance vector field table. Clip-maps can provide an adaptive level-of-detail and great savings in the amount of texture memory. See, the commonly-owned, co-pending U.S. patent application by Migdal et al., "Method and System for Providing Texture Using A Selected Portion Of A Texture Map," application Ser. No. 08/554,047, filed Nov. 6, 1995 (incorporated herein in its entirety by reference).

The inventors further recognize that the smoothness of irradiance field can be taken advantage of by using clip-maps for a 2-D or 3-D irradiance vector field table. Irradiance vectors change quickly close to a light source. However, at locations further from the light source, irradiance vectors eventually approach a radially symmetric field—as a point source would generate. (Illumination engineers have a rule of thumb that says that an area light source can be treated as a point source for points a distance of five times the light source diameter away (Ashdown, I., *J. Illuminating Eng. Soc.* 22(1):163–180 (Winter. 1993)).

Clip-mapping cleanly deals with points that are far away from the emitter, without needing a special case for points outside of a finite-sized table. In clip-mapping, a set of two- or three-dimensional irradiance vector field tables are generated to hold the field for a scene. Each successive irradiance vector field table spans a larger volume of space at a lower or coarser resolution. The coarsest level, corresponding to irradiance received very far away from the emitter encompasses all of space for a scene and has zero-length vectors. Clip mappings also allows these multiple levels of detail to be cleanly specified and organized.

Figure 4A:
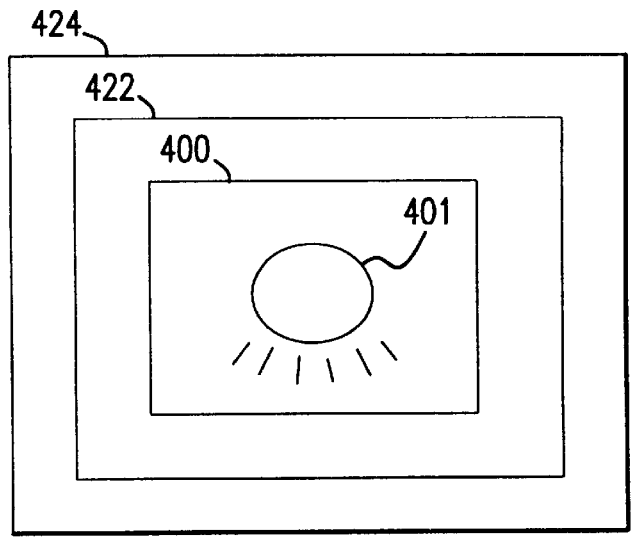
FIG. 4A is a drawing showing multiple areas within a scene.

For example, as shown in FIG. 4A, a scene having an area light source 401 can be sub-divided into three different field regions 400, 422, 424 covering a progressively larger area of the scene. According to the present invention, irradiance vector field tables 410, 412, 414 are generated independently for the corresponding field regions 400, 422, 424. Each irradiance vector field table 410, 412, 414 spans a larger volume of space at a lower or coarser resolution. In this way, each irradiance vector field table 410, 412, 414 can be equal in size (e.g. 16×16 texels), resulting in a great memory savings compared to generating a complete set of multi-resolutional irradiance field vector tables where each table must cover the entire scene. Note that one-eighth of each table after the first one (which covers the smallest volume of the scene at the finest resolution) doesn't need to be computed and stored, since its entries will never be accessed. Of course, the present invention, is not limited to clip-maps only. A single table at a fixed resolution for an entire scene or a complete set of multi-resolutional irradiance field vector tables can be used.

Figure 4B:
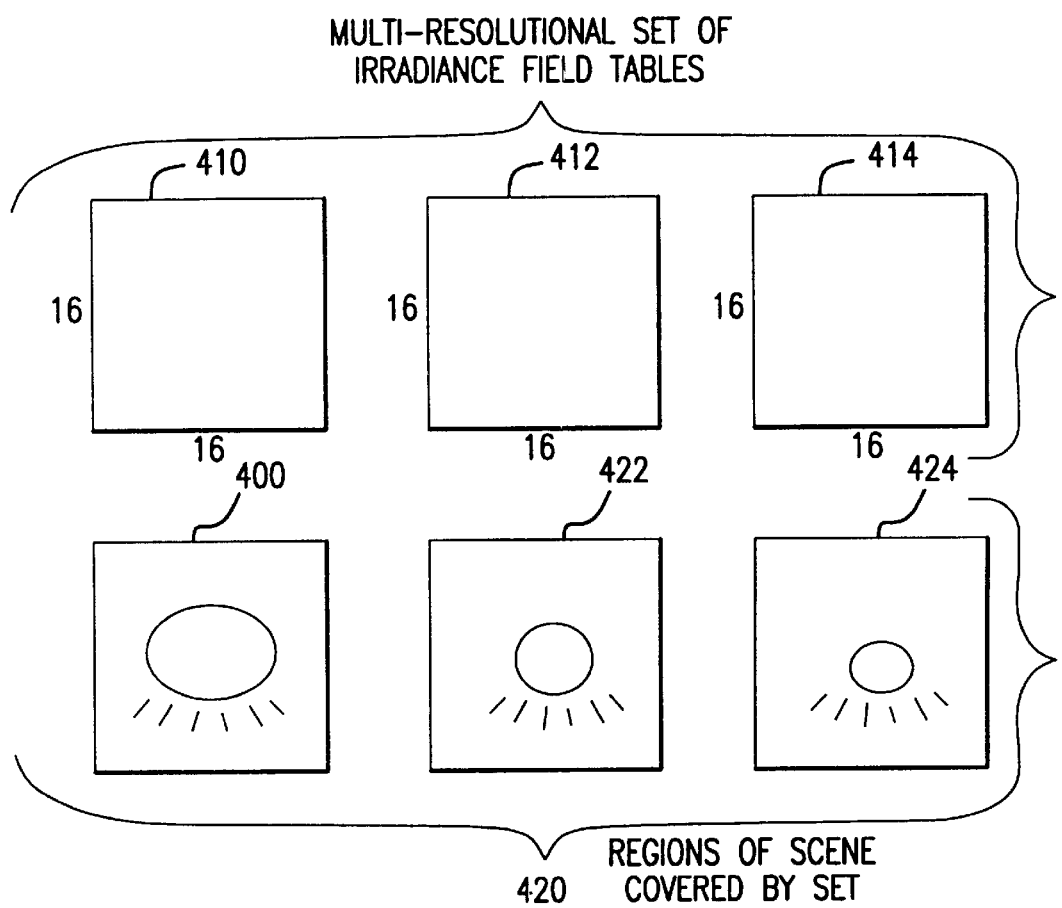
FIG. 4B is a drawing showing the multiple areas of FIG. 4A covered by a set of multi-resolutional irradiance field tables according to the present invention.
Figure 5:
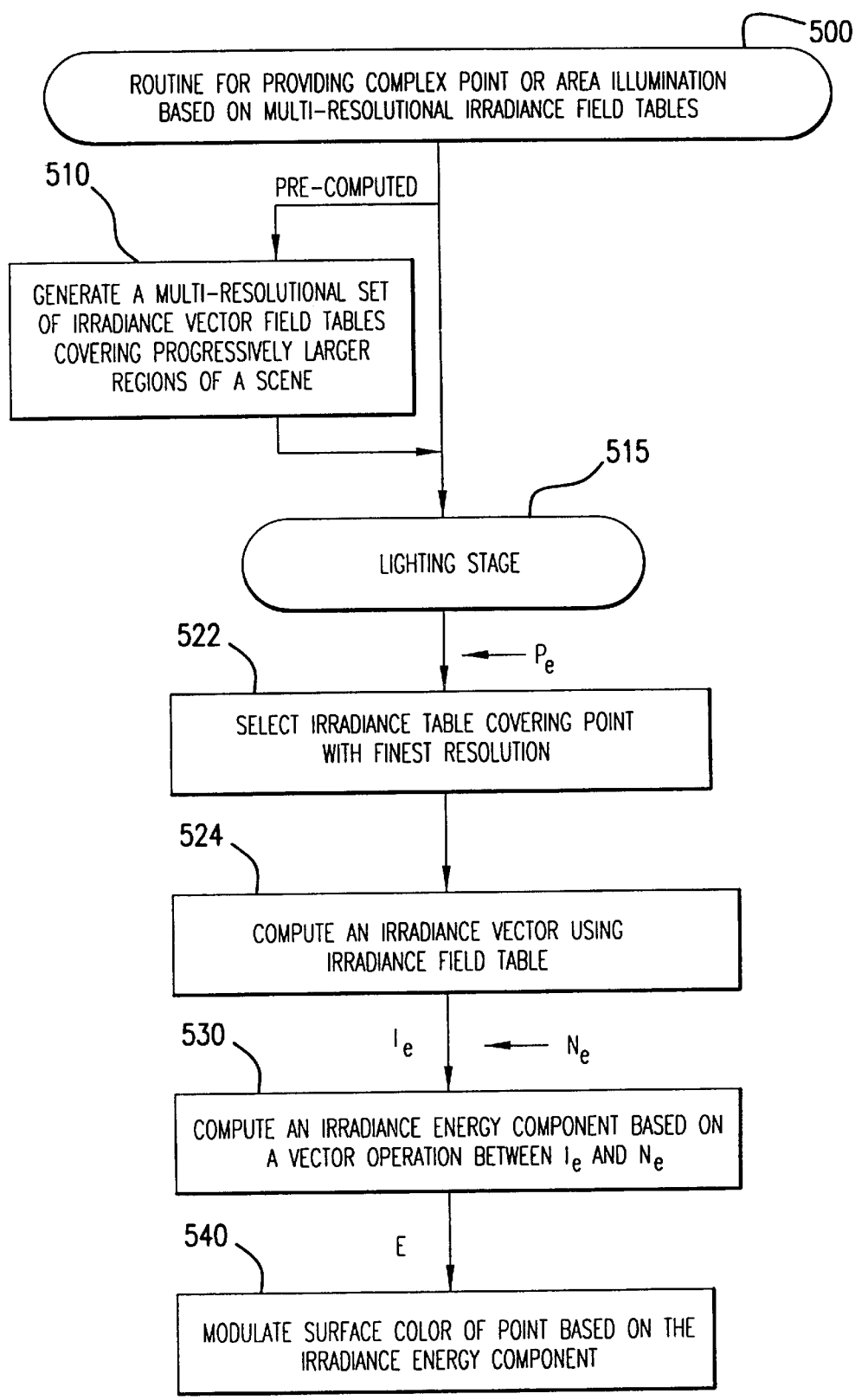
FIG. 5 is a flowchart of a routine for providing illumination using a set of multi-resolutional irradiance field tables in computer graphics shading according to another embodiment of the present invention.

FIG. 5 is a flowchart of a routine 500 for providing complex point and area illumination using a clip-map of multi-resolutional irradiance field tables in computer graphics shading according to another embodiment of the present invention. First, a set of multi-resolutional irradiance field tables is generated (step 510). The set of multi-resolutional irradiance field tables corresponds to a set of memory regions or tiles in a clip-map as described above with respect to FIGS. 4A and 4B. Preferably, the set of irradiance field tables is pre-computed and stored as a three-dimensional clip-map in a memory (such as a texture memory) prior to rendering. However, the present invention is not so limited as the irradiance field tables can be calculated and stored in a memory (such as a texture memory) during rendering depending upon processing power, time, and other design criteria.

Lighting stage 515 includes steps 522–540. Lighting stage 515 lights (or shades) one or more points in an object being rendered using irradiance field data stored in step 510. First, an irradiance table is selected which has a resolution (or level-of-detail) that covers a point in emitter space $P_e$. Preferably, the irradiance table within the clip-map is selected which has the finest resolution that covers the point $P_e$ (step 522).

Steps 524, 530, and 540 are similar to steps 120–140 described above with respect to FIG. 1. To compute lighting at its surface normal, and to compute its color, the irradiance vector at the point is computed by looking it up in the selected irradiance field table (step 522). For example, the eight vectors in the table that surround the point of interest are found and can be trilinearly interpolated to find the irradiance vector $I_e$ at the point $P_e$. Other filtering, such as tricubic, can also be used to compute the irradiance vector $I_e$.

Next, an irradiance energy component E is computed based on a vector operation between irradiance vector $I_e$ and a surface normal $N_e$ at point $P_e$ (step 530). For example, the vector operation can include calculating a dot product between irradiance vector $I_e$ and a surface normal $N_e$ at point $P_e$ to find incoming irradiance energy component E. The irradiance energy component E is then used in any lighting equation or shading model to modulate surface color (step 540).

In one implementation, steps 522, 524, and 530 are calculated on per-vertex basis, while step 540 is carried out on a per-pixel basis. However, the present invention is not intended to be so limited. In general, steps 522 to 540 can each be computed on a per-vertex and/or per-pixel basis, as would be apparent to a person skilled in the art given this description.

The present invention can also adapt detail in the clip maps depending upon how quickly the field is changing. In the above description, clip map tiles are arranged concentrically around the emitter which is most effective assuming the irradiance field becomes smoother in all directions at the same rate. For a light source with highly directional emission, the clip map should reflect that the field is changing more quickly in some directions than in others (for example, the shape of the tables could become rectangular). Animation The present invention can also be used to provide illumination in computer graphics animation, as would be apparent to a person skilled in the art given this description. The emitter's transformation can be modified from frame to frame. This means that the emitter can be moved around the scene very efficiently without needing to recompute the irradiance vector field table. If the shape or emission properties of the emitter vary, however, some or all of the irradiance vector field table is updated. If the geometry in the scene is being animated, shading calculations are re-done for each frame as is typically required in rendering animated sequences. Thus, no additional work is needed compared to what normally must be done when rendering animated sequences. See, e.g., Watt and Watt, *Advanced Animation and Rendering Techniques: Theory and Practice* (ACM Press, Addison-Wesley Publ.: New York, N.Y.), 1992 (incorporated in its entirety herein by reference); and Foley et al., chapter 21, pp. 1057–1081, incorporated herein by reference above.

Example Implementations

Examples of a graphics processing environment and graphics subsystem architecture providing complex point and area source illumination according to the present invention are described below with respect to FIGS. 6 to 9. These examples are illustrative and not intended to limit the present invention.

Figure 6:
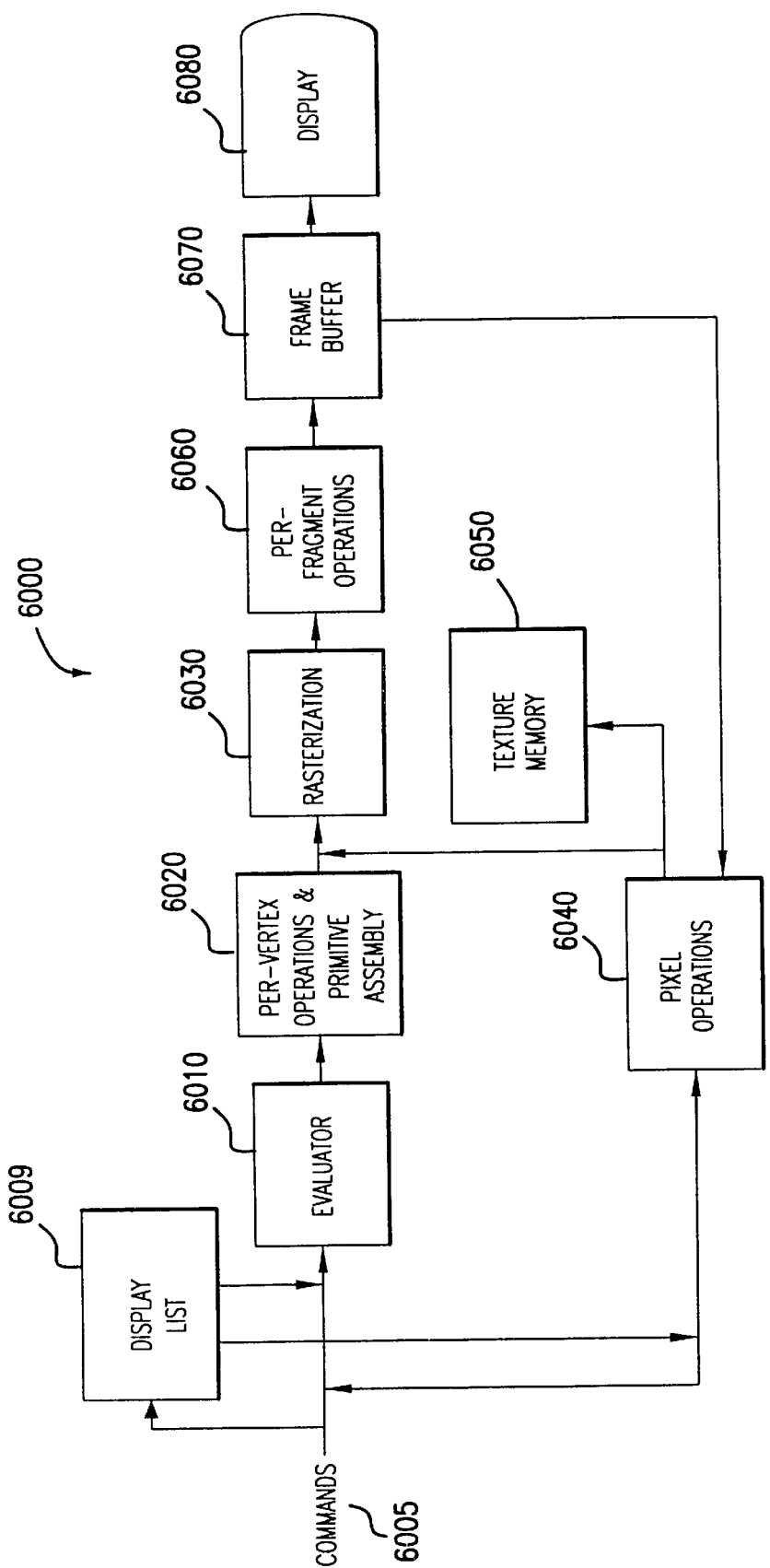
FIG. 6 is a graphics processing pipeline for supporting illumination according to the present invention.

FIG. 6 is a block diagram of an example graphics processing pipeline environment 6000 for implementing routines 100, 300, and 500 as described above. Graphics processing environment 6000 can include but is not limited to an OpenGL™ operation as described in Beider et al., *OpenGL Programming Guide, The Official Guide to Learning OpenGL,* Release 1, Silicon Graphics Inc. (Addison-Wesley Publishing Co., USA, 1993) and *OpenGL Reference Manual, The Official Reference Document for OpenGL,* Release 1, Silicon Graphics Inc. (Addison-Wesley Publishing Co., USA, 1992) (both of which are incorporated in their entirety herein by reference).

As shown in FIG. 6, graphics processing pipeline 6000 consists of a display list 6007, evaluator 6010, per-vertex operations and primitive assembly stage 6020, rasterization stage 6030, pixel operations stage 6040, texture memory 6050, per-fragment operations stage 6060, framebuffer 6070, and a computer graphics display unit 6080. Commands 6005 are input to the graphics processing pipeline 6000. Commands 6005 specify geometric objects to be drawn and control how the objects are handled during the various processing stages. Commands 6005 can be processed immediately through the pipeline 6000 or can be accumulated in display list 6007 for processing at a later time.

Evaluator 6010 approximates curve and surface geometry by evaluating polynomial commands of input values. During the next stage, per-vertex operations and primitive assembly stage 6020 processes geometric primitives. Geometric primitives are points, line segments, triangles, and polygons, all of which are described by vertices. Vertices are transformed and lit, and primitives are clipped to a viewport in preparation for the rasterization stage 6030.

Rasterization stage 6030 produces a series of framebuffer addresses and associated values using a two-dimensional description of a point, line segment, triangle, or polygon. Each fragment produced in rasterization stage 6030 is fed into the last stage, per-fragment operations stage 6060. Per-fragment operations stage 6060 performs the final operations on graphics data before the data stored as pixels in framebuffer 6070. These final operations can include conditional updates to the framebuffer 6070 based on incoming and previously stored Z values for Z buffering, blending of incoming pixel colors with stored colors, masking, and other logical operations on pixel values.

Input graphics data can be in the form of pixels rather than vertices. For example, an image used in texture mapping is processed in a pixel operation stage 6040. Pixel operation stage 6040 processes graphics data as pixels and stores a resulting texture map in texture memory 6050. Rasterization stage 6030 can then use the texture map stored in texture memory 6050 for performing texture processing. The output from pixel operations stage 6040 can also be applied directly to rasterization stage 6030 and merged with resulting fragments into framebuffer 6070 just as if the output was generated from geometric data.

In one embodiment of the present invention, the routine for providing complex point and area illumination 100 is implemented in graphics processing pipeline 6000 as follows. Texture memory 6050 is used to store the irradiance vector field table generated in step 110. Step 120 is processed as per-vertex operations in the per-vertex operations and primitive assembly stage 6020.

Steps 130 and 140 are processed on a per-pixel basis in pixel operations stage 6040. Pixel operations stage 6040 (or alternatively per-vertex operations and primitive assembly stage 6020) can output a color value based on diff-use and specular components calculated in step 140 to rasterization stage 6030 for processing.

Figure 7:
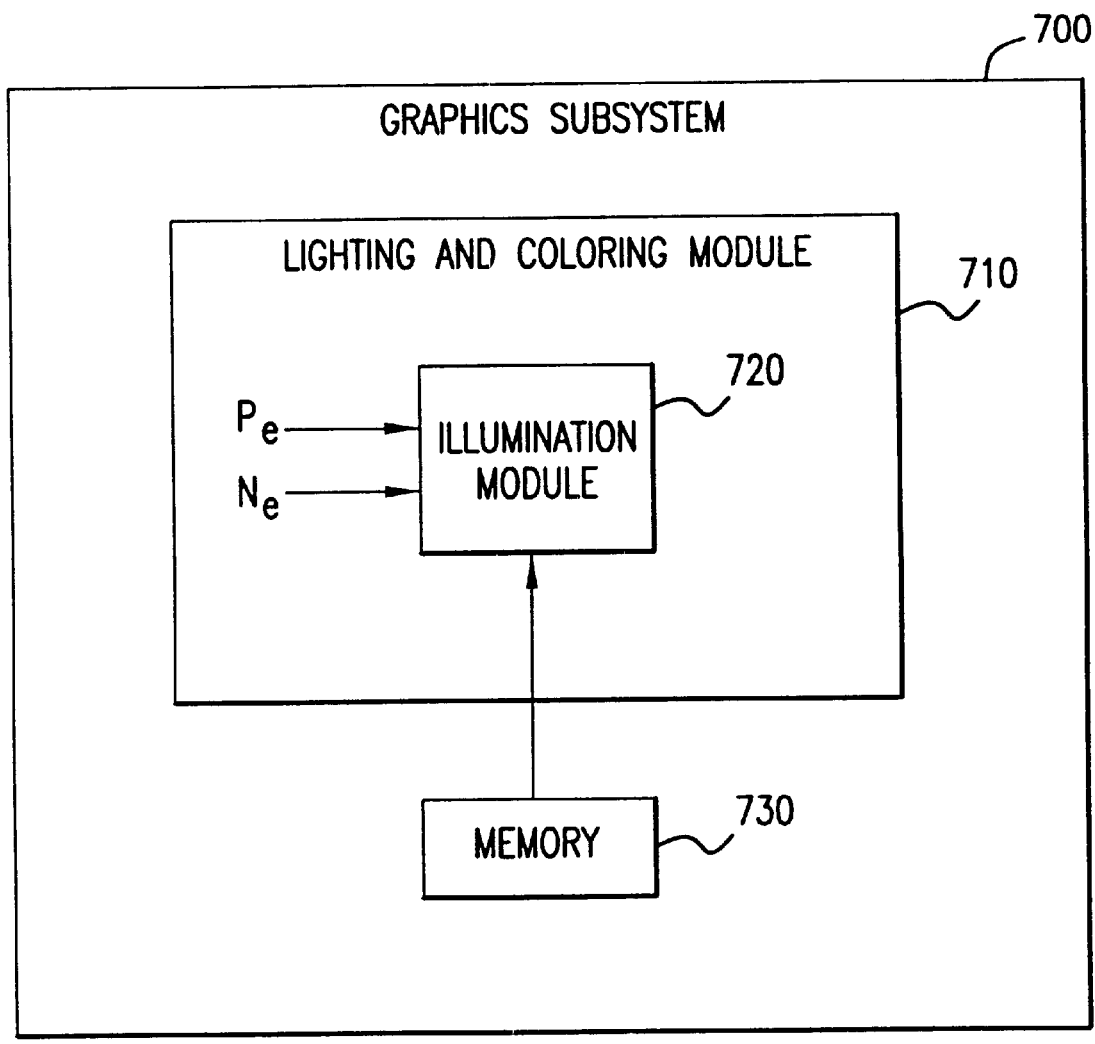
FIG. 7 is a block diagram illustrating a graphics subsystem for supporting illumination according to the present invention.

FIG. 7 is a schematic diagram showing an example graphics subsystem 700 implementing complex area or point illumination in shading according to the present invention. Lighting and coloring module 710 includes an illumination module 720. A memory 730 stores a 2D or 3D irradiance vector field table (or set of multi-resolutional irradiance vector field tables) generated according to steps 110, 310, or 510 above. In one example, illumination module 720 implements routine 100 primarily in software as a program module that can be executed by a graphics processor or another processor. Various filtering functions can also used to interpolate between entries in the irradiance vector field table(s).

Efficient Hardware Simulation of Complex Point and Area Light Sources

Figure 8:
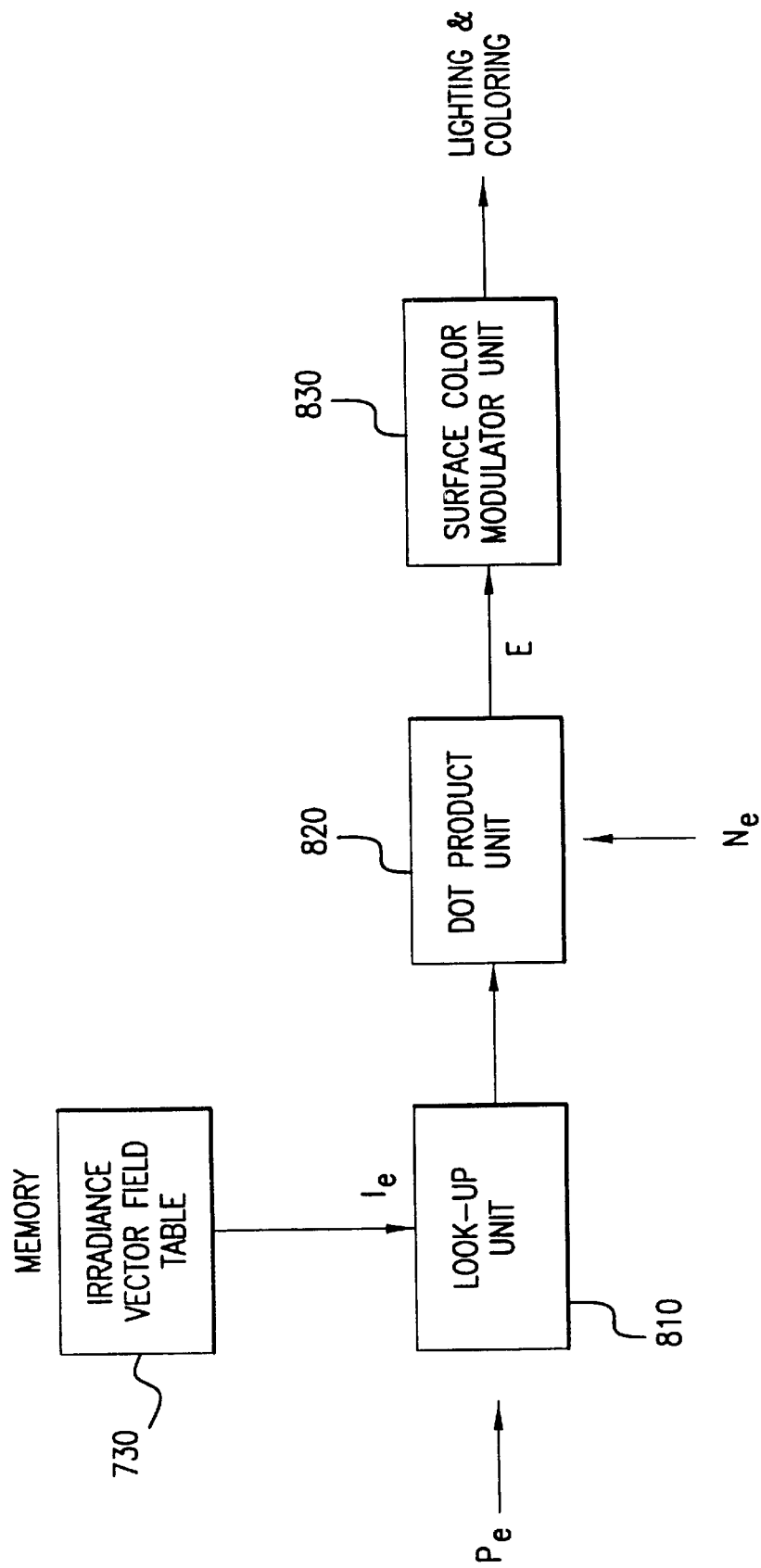
FIG. 8 is a block diagram illustrating additional hardware for supporting illumination according to the present invention.

FIG. 8 is a block diagram of illumination module 720 that implements routine 100 inexpensively in hardware according to another embodiment of the present invention. Illumination module 720 includes look-up unit 810, dot product unit 820, and a surface color modulation unit 830. A transformation unit (not shown) can be used to transform a point and surface normal from world space to emitter space. In general, each transformation of the point or surface normal requires 16 multiply operations and 12 add operations.

Look-up unit 810 computes an irradiance vector for a point using the stored irradiance vector table as described with respect to step 110. Look-up unit 810 then finds 8 pre-computed vectors adjacent to the transformed point in emitter space and performs a trilinear interpolation to obtain a lighting vector representative of the irradiance vector field. This look-up and interpolation requires 8 vector look-ups, 21 multiply operations, and 42 additions.

Dot product unit 820 computes the dot product of the vector output by look-up unit 810 and the surface normal in emitter space N. This dot product calculation only requires 3 multiply operations and 2 add operations. Dot product unit 820 then output the irradiance energy component E.

Surface color modulator unit 830 uses irradiance energy component E to modulate surface color in an operation that only requires 3 multiply operations. Surface color modulator unit 830 outputs an shading color representative of incident point or area illumination which is then output as the final shaded color or combined with further lighting and coloring operations in a shader.

An optional unit (not shown) for computing light visibility information (or occlusion), as described above, can used to scale the irradiance energy component E output from dot product unit 820 and/or to scale the shading color from result from surface color modulator unit 830.

Thus, in this embodiment, the present invention can represent complex point and area light sources inexpensively with little additional hardware.

Example GUI Computer System

Figure 9:
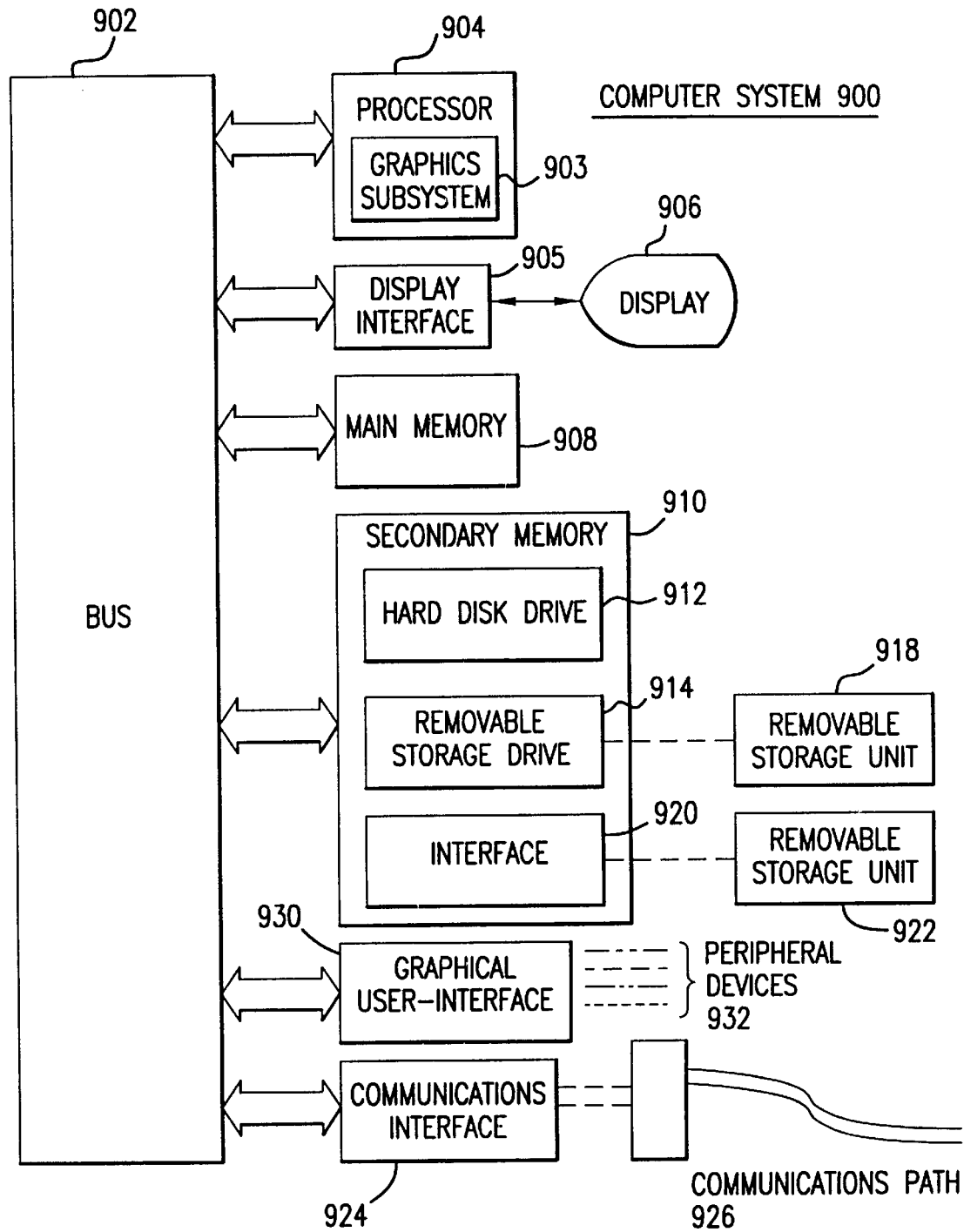
FIG. 9 shows an example computer system including the graphics subsystem of FIG. 7.

FIG. 9 is a block diagram illustrating an example environment in which the present invention can operate. The environment is a computer system 900 that includes one or more processors, such as processor 904. Computer system 900 can include any type of computer graphics computer, virtual machine, processor (single bus, multiple bus, or bus-less processor(s)), workstation, and network architecture. In one preferred implementation, an OpenGL machine can be used including, but not limited to, graphics workstations manufactured by Silicon Graphics, Inc.

Processor 904 is connected to a communications bus 902. Various software embodiments are described in terms of this example computer system. This description is illustrative and not intended to limit the present invention. After reading this description, it will be apparent to a person skilled in the relevant art how to implement the invention using other computer systems and/or computer architectures.

Computer system 900 includes a graphics subsystem 903. Graphics subsystem 903 can be implemented as one or more processor chips. Graphics subsystem 903 can be included as part of processor 904 as shown in FIG. 9 or as a separate graphics engine or processor. Graphics data is output from the graphics subsystem 903 to the bus 902. Display interface 905 forwards graphics data from the bus 902 for display on the display unit 906.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc., which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices via communications path 926. Examples of communications interface 924 can include a modem, a network interface (such as Ethernet card), a communications port, etc. Software and data transferred via communications interface 924 are in the form of signals which can be electronic, electromagnetic, optical or other signals capable of being received by communications interface 924, via communications path 926. Note that communications interface 924 provides a means by which computer system 900 can interface to a network such as the Internet.

Graphical user interface module 930 transfers user inputs from peripheral devices 932 to bus 902. These peripheral devices 932 can be a mouse, keyboard, touch screen, microphone, joystick, stylus, light pen, voice recognition unit, or any other type of peripheral unit.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 9. In this document, the term "computer program product" is used to generally refer to removable storage unit 918 or a hard disk installed in hard disk drive 912. These computer program products are means for providing software to computer system 900.

Computer programs (also called computer control logic) are stored in main memory and/or secondary memory 910 computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912, or communications interface 924. Alternatively, the computer program product may be downloaded to computer system 900 over communications path 926. The control logic (software), when executed by the processor 904, causes the processor 904 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for providing illumination in computer graphics shading, comprising the steps of:

generating an irradiance vector field table representative of an irradiance field for a scene to be rendered, wherein the irradiance vector field table includes a set of points and irradiance vectors identifying emission from at least one area light source emitter within said scene; and lighting said scene based on said irradiance vectors stored in the irradiance vector field table, wherein said lighting step further comprises the steps of looking up an irradiance vector for a point using the irradiance vector field table, and performing a vector operation between the irradiance vector and a surface normal for the point to compute an irradiance energy component, whereby the irradiance energy component can be used in determining a shade value for the point, whereby highly efficient computation in computer graphics shading is realized as the computation is independent of the complexity of said area light source emitter, and whereby the actual geometry and emission distribution of said area light source emitter are not needed for a lighting calculation.

2. The method of claim 1, wherein said lighting step, for each point being lit, further comprises the step of modulating surface color of the point based on the irradiance energy component.

3. The method of claim 1, wherein said irradiance vector looking up step comprises the steps of:

looking up irradiance vectors for points adjacent to a point of interest in the irradiance vector field table; and interpolating the adjacent irradiance vectors to compute the irradiance vector for the point of interest.

4. The method of claim 1, wherein said vector operation performing step comprises the step of calculating a dot product between the irradiance vector and the surface normal for the point.

5. The method of claim 1, wherein said generating step generates the irradiance vector field table in emitter space, and further comprising the step of transforming each point and corresponding surface normal to emitter space, prior to said lighting step.

6. The method of claim 1, wherein said generating step generates a three-dimensional irradiance vector field table representative of a three-dimensional irradiance field.

7. The method of claim 1, wherein said generating step further comprises the step of generating an irradiance vector field table representative of an irradiance field of at least one point light source emitter within said scene.

8. The method of claim 7, wherein said generating step further comprises the step of generating an irradiance vector field table representative of an irradiance field of at least one point light source emitter defined by a luminaire file format.

9. The method of claim 1, further comprising the step of storing the irradiance vector field table in memory.

10. The method of claim 1, wherein said generating step generates a set of multi-resolutional irradiance field tables covering progressively larger regions of a scene at progressively coarser resolutions.

11. The method of claim 1, wherein said generating step further comprises the step of encoding visibility information to represent shadows in the irradiance field.

12. The method of claim 1, wherein said generating step further comprises the step of encoding visibility information to represent participating media in the irradiance field.

13. The method of claim 1, further comprising the steps of:

determining visibility information from a shadow map; and scaling the irradiance energy component based on said visibility information.

14. The method of claim 1, further comprising the steps of:

performing a back-projection calculation to determine visibility information; and scaling the irradiance energy component based on said visibility information.

15. The method of claim 1, further comprising the steps of:

performing a shadow volume calculation to determine visibility information; and scaling the irradiance energy component based on said visibility information.

16. A method of claim 1, further comprising the steps of:
rendering a first image using the irradiance vector field table to color pixels;
rendering a second image having surface normals encoded in red, green, and blue (RGB) color components;
multiplying the first and second images to obtain a third image;
accumulating components in said third image to obtain a fourth image;
rendering a scene with at least one of color and texture to obtain a fifth image; and
multiplying the fourth and fifth images to obtain a final display image.

17. A system for providing illumination in computer graphics shading, comprising:
generating means for generating an irradiance vector field table representative of an irradiance field for a scene to be rendered, wherein said irradiance vector field table includes a set of points and irradiance vectors identifying emission from at least one area light source emitter within said scene; and
lighting means for lighting said scene based on said irradiance vectors stored in said irradiance vector field table, wherein said lighting means further comprises irradiance vector computing means for looking up an irradiance vector for a point using said irradiance vector field table, and
vector operation performing means for performing a vector operation between said irradiance vector and a surface normal for said point to compute an irradiance energy component,
whereby said irradiance energy component can be used in determining a shade value for said point,
whereby highly efficient computation in computer graphics shading is realized as the computation is independent of the complexity of said area light source emitter, and
whereby the actual geometry and emission distribution of said area light source emitter are not needed for a lighting calculation.

18. The system of claim 17, wherein said lighting means further comprises modulating means for modulating a surface color of said point based on said irradiance energy component.

19. The system of claim 17, wherein said irradiance vector computing means comprises:
look up means for looking up irradiance vectors for adjacent points in said irradiance vector field table; and
interpolating means for interpolating said irradiance vectors found by said look up means to compute said irradiance vector.

20. The system of claim 17, wherein said vector operation performing means comprises calculating means for calculating a dot product between said irradiance vector and said surface normal for said point.

21. The system of claim 17, wherein said generating means generates said irradiance vector field table in emitter space, and further comprising transforming means for transforming each point and corresponding surface normal to emitter space prior to lighting a point.

22. The system of claim 18, wherein said generating means generates a three-dimensional irradiance vector field table representative of a three-dimensional irradiance field.

23. The system of claim 17, wherein said irradiance vector field table further includes a set of points and irradiance vectors identifying emission from at least one point light source emitter within said scene.

24. The system of claim 23, wherein said irradiance vector field table further includes a set of points and irradiance vectors identifying emission from at least one point light source emitter defined by a luminaire file format.

25. The system of claim 17, further comprising memory for storing said irradiance vector field table.

26. The system of claim 17, wherein said generating means generates a set of multi-resolutional irradiance field tables covering progressively larger regions of a scene at progressively coarser resolutions.

27. The system of claim 17, wherein said generating means further comprises means for encoding visibility information to represent shadows in the irradiance field.

28. The system of claim 17, wherein said generating means further comprises means for encoding visibility information to represent participating media in the irradiance field.

29. The system of claim 17, further comprising:
means for determining visibility information from a shadow map; and
means for scaling said irradiance energy component based on said visibility information.

30. The system of claim 17, further comprising:
means for performing a back-projection calculation to determine visibility information; and
means for scaling said irradiance energy component based on said visibility information.

31. The system of claim 17, further comprising:
means for performing a shadow volume calculation to determine visibility information; and
means for scaling said irradiance energy component based on said visibility information.

32. A system of claim 17, further comprising:
rendering means for generating a combination of first to sixth framebuffer images, said rendering means including:
means for rendering a first image using said irradiance vector field table to color pixels;
means for rendering a second image having surface normals encoded in red, green, and blue (RGB) color components;
means for multiplying said first and second images to obtain a third image;
means for accumulating components in said third image to obtain a fourth image;
means for rendering a scene with at least one of color and texture to obtain a fifth image; and
means for multiplying said fourth and fifth images to obtain a final display image.

33. A computer program product comprising a computer useable medium having computer program logic recorded thereon for enabling a graphics processor in a computer system to provide illumination in computer graphics shading, said computer program logic comprising:
means for enabling the graphics processor to generate an irradiance vector field table representative of an irradiance field for a scene to be rendered, wherein said irradiance vector field table includes a set of points and irradiance vectors identifying emission from at least one area light source emitter within said scene;
means for enabling the graphics processor to light said scene based on said irradiance vectors stored in said irradiance vector field table, wherein said lighting enabling means further comprises means for enabling the graphics processor to look up an irradiance vector for a point using said irradiance vector field table, and perform a vector operation between said irradiance vector and a surface normal for said point to compute an irradiance energy component, whereby the irradiance energy component can be used in determining a shade value for said point, whereby highly efficient computation in computer graphics shading is realized as the computation is independent of the complexity of said area light source emitter, and whereby the actual geometry and emission distribution of said area light source emitter are not needed for a lighting calculation.

34. A system for shading a point of a computer graphics image to represent illumination from a source, comprising:

a memory that stores an irradiance vector field table representative of an irradiance field for the source illumination, wherein the irradiance vector field table includes a set of points and irradiance vectors identifying emission from at least one area light source within said source illumination;

a look-up unit that looks up and interpolates irradiance vectors for selected points in the irradiance vector field table to compute an interpolated irradiance vector; and a dot product unit that calculates a dot product between said interpolated irradiance vector and a surface normal for the point being shaded and outputs an irradiance energy component; whereby, the irradiance energy component can be used in determining a final shading color value for the point.

35. The system of claim 34, wherein said memory comprises a texture memory for storing a three-dimensional irradiance vector field table representative of a three-dimensional irradiance field.

36. The system of claim 34, wherein the source illumination further comprises at least one point light source, and said memory stores an irradiance vector field table representative of the irradiance field of the at least one point light source.

37. A method for providing illumination in computer graphics animation, comprising the steps of:

generating an irradiance vector field table representative of an irradiance field for a scene to be rendered, wherein said irradiance vector field table includes a set of points and irradiance vectors identifying emission from at least one area light source emitter within said scene; and lighting said scene in an animation frame based on said irradiance vectors stored in said irradiance vector field table, wherein said lighting step comprises the step of looking up an irradiance vector for a point using said irradiance vector field table, and performing a vector operation between the irradiance vector and a surface normal for the point to compute an irradiance energy component, whereby the irradiance energy component can be used in determining a shade value for the point, whereby highly efficient computation in computer graphics shading is realized as the computation is independent of the complexity of said area light source emitter, and whereby the actual geometry and emission distribution of said area light source emitter are not needed for a lighting calculation.

* * * * *

UNITED STATES PATENT AND TRADEMARK OFFICE
CERTIFICATE OF CORRECTION

PATENT NO.    : 6,567,083 B1                                              Page 1 of 1
DATED         : May 20, 2003
INVENTOR(S)   : Baum et al.

It is certified that error appears in the above-identified patent and that said Letters Patent is hereby corrected as shown below:

Column 17,
Line 4, please delete "diff-use" and insert therefore -- diffuse --;
Line 47, please delete "an" and insert therefore -- a --;
Line 52, please insert the word -- be -- after the word "can"

Signed and Sealed this

Ninth Day of March, 2004

JON W. DUDAS
*Acting Director of the United States Patent and Trademark Office*